United States Patent
Madmony et al.

(10) Patent No.: US 10,452,789 B2
(45) Date of Patent: Oct. 22, 2019

(54) EFFICIENT PACKING OF OBJECTS

(71) Applicants: Maoz Madmony, Beit Kama (IL);
Shahar Fleishman, Hod Hasharon (IL);
Mark Kliger, Tel Aviv-Jaffa (IL);
Gershom Kutliroff, Alon Shvut (IL)

(72) Inventors: Maoz Madmony, Beit Kama (IL);
Shahar Fleishman, Hod Hasharon (IL);
Mark Kliger, Tel Aviv-Jaffa (IL);
Gershom Kutliroff, Alon Shvut (IL)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 14/954,959

(22) Filed: Nov. 30, 2015

(65) Prior Publication Data

US 2017/0154127 A1 Jun. 1, 2017

(51) Int. Cl.
*G06F 17/50* (2006.01)
*G06F 16/583* (2019.01)

(52) U.S. Cl.
CPC .......... *G06F 17/50* (2013.01); *G06F 16/5854* (2019.01); *G06F 2217/38* (2013.01)

(58) Field of Classification Search
CPC ... G06F 2217/38; G06F 17/50; G06F 16/5854
See application file for complete search history.

(56) References Cited

U.S. PATENT DOCUMENTS

| | | | |
|---|---|---|---|
| 6,876,958 | B1 | 4/2005 | Chowdhury et al. |
| 2002/0118873 | A1* | 8/2002 | Tran ................ G06T 7/0004 |
| | | | 382/143 |
| 2008/0020916 | A1* | 1/2008 | Magnell ................ B65B 5/02 |
| | | | 493/65 |
| 2012/0158385 | A1 | 6/2012 | Arunapuram et al. |
| 2012/0283868 | A1 | 11/2012 | Rutt et al. |
| 2014/0230374 | A1* | 8/2014 | Tian .................. G06Q 10/04 |
| | | | 53/445 |

(Continued)

OTHER PUBLICATIONS

Barequet et al., "Efficiently Approximating the Minimum—Volume Bounding Box of a Point Set in Three Dimensions", J. Algorithms, 38:1, 2001, 17 pages.

(Continued)

*Primary Examiner* — Dwin M Craig
(74) *Attorney, Agent, or Firm* — Jordan IP Law, LLC

(57) ABSTRACT

Systems, apparatuses and/or methods may provide for generating a packing order of items within a container that consolidates the items into a reduced space. Items may be scanned with a three-dimensional (3D) imager, and models may be generated of the items based on the data from the 3D imager. The items may be located within minimal-volume enclosing bounding boxes, which may be analyzed to determine whether they may be merged together in one of their bounding boxes, or into a new bounding box that is spatially advantageous in terms of packing. If a combination of items is realizable and is determined to take up less space in a bounding box than the bounding boxes of the items considered separately, then they may be merged into a single bounding box. Thus, a spatially efficient packing sequence for a plurality of real objects may be generated to maximize packing efficiency.

25 Claims, 18 Drawing Sheets

(56) References Cited

U.S. PATENT DOCUMENTS

2015/0095189 A1 4/2015 Dharssi et al.

OTHER PUBLICATIONS

Kaufman et al., "Volume Graphics", IEEE Computer, Jul. 1993, pp. 51-64, vol. 26 issue 7, IEEE Computer Society Press, Los Alamitos CA.
Lim et al., "3-D Container Packing Heuristics", Applied Intelligence, Mar. 2005, pp. 125-134, vol. 22—issue 2, Kluwer Academic Publishers, Hingham MA.
Newcombe et al., "KinectFusion: Real-Time Dense Surface Mapping and Tracking", ISMAR '11 Proceedings of the 2011 10th IEEE International Symposium on Mixed and Augmented Reality, Oct. 26, 2011, 10 pages, Washington DC.
International Preliminary Report on Patentability for International Patent Application No. PCT/US2016/054046, dated Jun. 14, 2018, 7 pages.
International Search Report and Written Opinion for International Patent Application No. PCT/US2016/054046, dated Jan. 16, 2017, 10 pages.

* cited by examiner

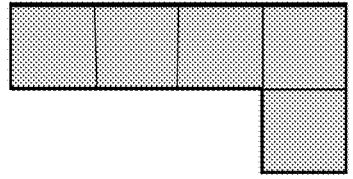
FIG. 15A Item B
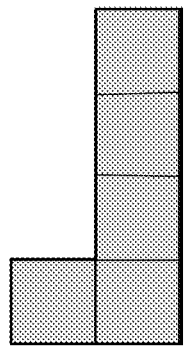
FIG. 15B Item B rotated 90°
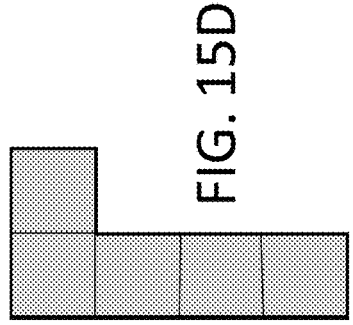
FIG. 15C Item B rotated 180°
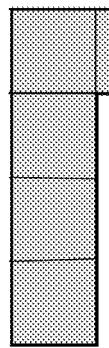
FIG. 15D Item B rotated 270°

EFFICIENT PACKING OF OBJECTS

TECHNICAL FIELD

Embodiments generally relate to packing objects in confined spaces. More particularly, embodiments relate to efficient packing of items in a storage space and/or in a storage container.

BACKGROUND

An ability to efficiently pack items together in a confined space may be of value in commercial and/or non-commercial settings. The items to be packed may be of regular shape (e.g., items that are packaged in standardized boxes such that the items are the boxes themselves) or they may be of irregular and/or varied shape. In the latter case, a packing sequence may fall to a worker that is tasked with "eyeballing" various items to be packed to provide a realizable packing sequence on-the-fly. Such an approach may be inefficient and costly in terms of labor inputs and time, and may provide irregular, uncertain, inefficient, and/or inconsistent results.

The general problem of "bin packing" has been studied from a mathematical point of view. However, a mathematical solution is not necessarily a practical, implementable solution, since some mathematical components may be intractable in terms of available hardware resources. The intractability may be especially true given real-world demands for speed in determining a packing order.

BRIEF DESCRIPTION OF THE DRAWINGS

The various advantages of the embodiments will become apparent to one skilled in the art by reading the following specification and appended claims, and by referencing the following drawings, in which:

FIGS. 15A-15D are examples of an item shown in various orientations according to an embodiment;

DESCRIPTION OF EMBODIMENTS

Figure 1:
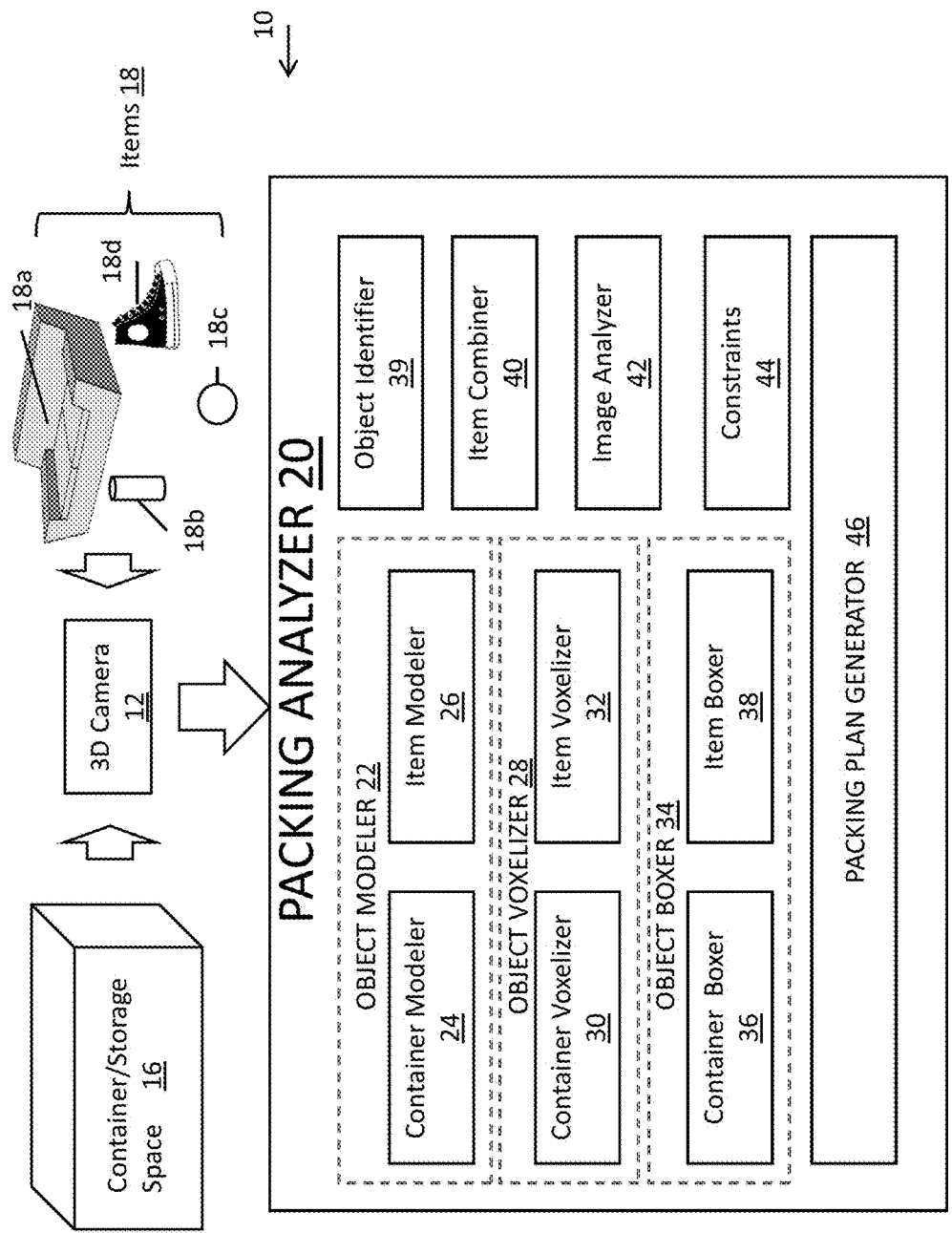
FIG. 1 is a block diagram of an example of a system to pack objects according to an embodiment.

FIG. 1 shows a block diagram of an embodiment of a system 10 to facilitate a spatially efficient packing of objects. Generally, the term "object" may refer to individual items of commerce (e.g., books, shoes, toothbrushes, furniture, food, etc.) as well as to storage spaces into which it is desired to efficiently pack items. The storage space may be a mathematically defined, bounded region of space into which items are to be placed, or it may be a physical container such as a bin, a truck, a room, a warehouse, a refrigeration unit, a rail car, etc. In one example, items may be packed into a container in a manner that may consolidate the items together to reduce the total space required to pack the items. In other words, a method and/or an apparatus may be implemented to maximize use of storage space that is available to pack a collection of items.

A three-dimensional (3D) camera 12 may be used to obtain image data of a container/storage space 16 and one or more items 18. In some embodiments, the image data may be obtained or derived from data provided by a two-dimensional (2D) camera or sensor, a non-3D imager, and/or a 3D imager, alone or in combination. While embodiments below reference the container 16, it should be understood that the storage space 16 may replace the container 16 in the following examples.

In the illustrated example, the items 18 include a sofa 18a, a cylinder 18b, a ball 18c, and a shoe 18d. In addition, the 3D camera may contain an imager to obtain depth data of a subject such as, for example, the container 16 and/or the items 18. The 3D camera may be, for example, a dedicated, stand-alone unit, or may be incorporated into another device such as a smart phone, tablet computer, notebook computer, tablet computer, convertible tablet, personal digital assistant/PDA, mobile Internet device/MID, wearable computer, desktop computer, camcorder, video recorder, media player, smart TV, gaming console, etc., or any combination thereof. For example, a platform that includes a 3D camera technology to be implemented in embodiments may include Intel® RealSense® (registered trademarks of Intel Corporation).

In the illustrated example, the 3D camera sends captured image data to a packing analyzer 20 that analyzes the image data. The illustrated packing analyzer 20 includes an object modeler 22, which further includes a container modeler 24 and an item modeler 26. The modeler 24, 26 may generate 3D models of the container 16 or items 18, respectively. In this regard, various modeling protocols may be utilized (e.g., a point cloud model, etc.) to generate the 3D models. The illustrated packing analyzer 20 also includes an object voxelizer 28, which further includes a container voxelizer 30 and an item voxelizer 32. The voxelizers 30, 32 may generate a voxelized form of a respective model, which may reduce computation time in manipulating depictions of objects (e.g., containers, items, etc.).

The approximate size and shape of objects may be represented in voxels. A voxel may refer to a unit of 3D space that represents data points of a 3D point cloud or other data that lies within the 3D cloud. The voxel may provide a relatively more computationally efficient manner of representing that data. A size of the voxel may be chosen, wherein the size may represent a tradeoff between accuracy and runtime performance and/or may depend on a specific application/use of the voxel. Further information regarding voxelization may be found in a paper to Kaufman et al. entitled "Volume Graphics," *Computer* IEEE, July 1993, 51-65.

The packing analyzer 20 also includes an object boxer 34, which further includes a container boxer 36 and item boxer 38. As discussed below, the boxers 36, 38 may generate maximal (volume) enclosed bounded boxes or minimal (volume) enclosed bounding boxes with respect to voxelized depictions of containers and items, respectively.

In some embodiments, the container modeler 24 and the item modeler 26 may be unitary with one another, or they may be separate. For example, the modelers 24, 26 may be unitary or separate circuits, software components, and combinations thereof. Similarly, the container voxelizer 30 and the item voxelizer 32 may be unitary with one another, or they may be separate. For example, the voxelizers 30, 32 may be unitary or separate circuits, software components, and combinations thereof. Also, the container boxer 36 and the item boxer 38 may be may be unitary with one another or they may be separate. For example, the boxers 36, 38 may be unitary or they may be separate circuits, software components, or combinations thereof.

The packing analyzer 20 further includes an object identifier 39 to identify objects using non-image data such as data provided by a manufacturer of an object, object blueprints, data provided by inertial measurement devices, barcode scanners, and/or other model data that may be available through the Internet cloud. The packing analyzer 20 also includes an item combiner 40 to combine objects, an image analyzer 42 to analyze images of objects, and constraints 44 that may be applied. As discussed below, the object identifier 39, the item combiner 40, the image analyzer 42, and the constraints 44 may be implemented to further facilitate a spatially efficient packing of objects. Moreover, the packing analyzer 20 includes a packing plan generator 46 that may use the analysis provided by the packing analyzer 20 to generate a packing plan. In one example, a machine, a robot, and/or a human worker may use the packing plan as a guide to pack the items 18 into the container 16.

Figure 2:
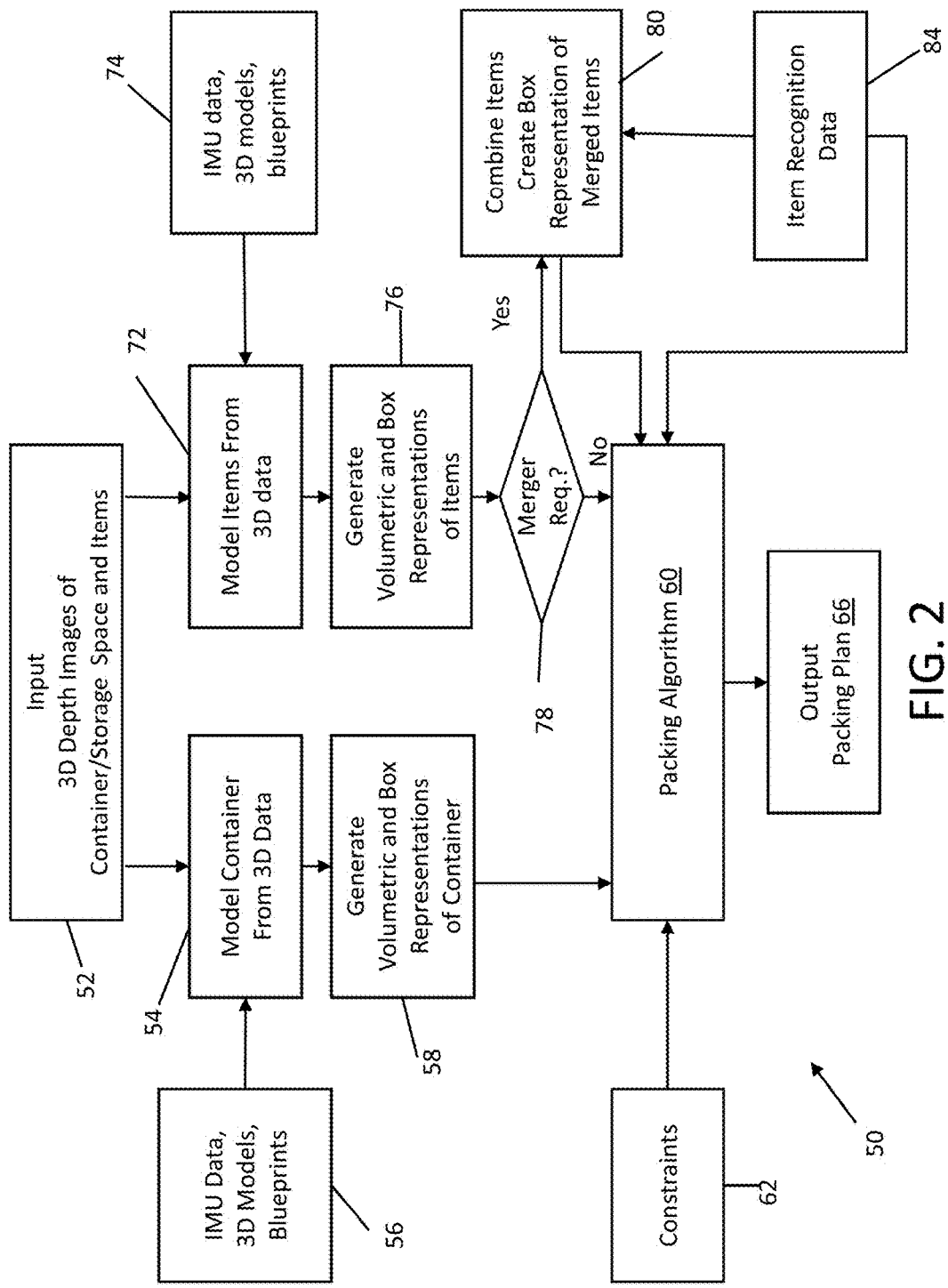
FIG. 2 is a flowchart of an example of a method of packing objects according to an embodiment.

FIG. 2 shows a flowchart of an example of a method 50 of packing items into a storage space, such as the container 16 (FIG. 1), discussed above. The method 50 may be implemented in one or more modules as a set of logic instructions stored in a machine- or computer-readable storage medium such as random access memory (RAM), read only memory (ROM), programmable ROM (PROM), flash memory, etc., as configurable logic such as, for example, programmable logic arrays (PLAs), field programmable gate arrays (FPGAs), complex programmable logic devices (CPLDs), as fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 50 may be written in any combination of one or more programming languages, including an object oriented programming language such as C++ or the like and conventional procedural programming languages, such as the "C" programming language or similar programming languages. Moreover, the method 50 may be implemented using any of the herein mentioned circuit technologies.

Illustrated processing block 52 takes as input 3D data of a container and an item, such as the container 16 and the items 18 (FIG. 1), discussed above. The 3D data may be raw 3D data provided by a depth sensor in a 3D camera, or it may be processed 3D image data. The 3D data may be forwarded along two generally parallel branches in the method 50, which may be executed in parallel or sequentially.

A first branch begins at illustrated processing block 54, where the 3D data may be used by a container modeler, such as the container modeler 24 (FIG. 1), discussed above, to construct a model of the container. The model may be in the form of a point cloud, depicting the interior surface of the container, or the model may be of another form suitable for constructing a model of the interior of the container. Additional sources of information that may be useful in the construction of the model at block 54 may be provided by processing block 56. The sources of information may include data provided by a manufacturer of the container, barcode scanner data, data derived from handmade mappings of the container, container blueprints, model data that may be available through the Internet cloud, and other sources. Data may additionally be provided by inertial sensors of an inertial measurement unit (IMU) to determine a local direction of gravity, which may be of use in differentiating between a container ceiling and a container floor.

The sources of information may be combined at block 54 with the data from block 52 to generate a model of the interior of the container. The model may reflect a size and a shape of interior container walls and space, as well as of other container elements that may bear on its use as storage. For example, the other container elements may include shelves, walls, immovable architectural features, and so forth. In some embodiments, an object recognition algorithm may be used to recognize the other container elements including, for example, shelves, closets, or other features.

Processing block 58 generates volumetric and box representations of the container based on the model generated in block 54. In one example illustrated in FIG. 3, a method 86 to generate volumetric and box representations may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

In the illustrated method 86, a 3D frame of the container may be provided at processing block 88. Processing block 90 uses the data provided by the frame to generate a 3D point cloud model of the container. Often, the number of data points presented by the 3D point cloud model may tax available computational resources. Thus, it may be useful to reduce a size of a data set used in the model of the container. Notably, processing block 92 reduces the size of the data set used to model the container by voxelizing the 3D point cloud. In one example, block 92 may be implemented by the container voxelizer 30 (FIG. 1), discussed above.

As noted above, voxels may provide for a relatively more computationally efficient depiction of data. Thus, instead of being presented in terms of large numbers of individual points corresponding, for example, to the volume or the interior surface of the container, the model may be built up of voxels, each voxel representing groups of such points. A size of a voxel may be determined by available computational resources and/or by the complexity of the container being modeled. The task of performing further computations on the model may become computationally simpler at the potential expense of some loss of fine granularity when voxels are used rather than individual points. In some settings, such as where the container may be of simple form and the computational resources on hand are extensive, an embodiment may omit, bypass and/or ignore voxelizing the container space.

Figure 3:
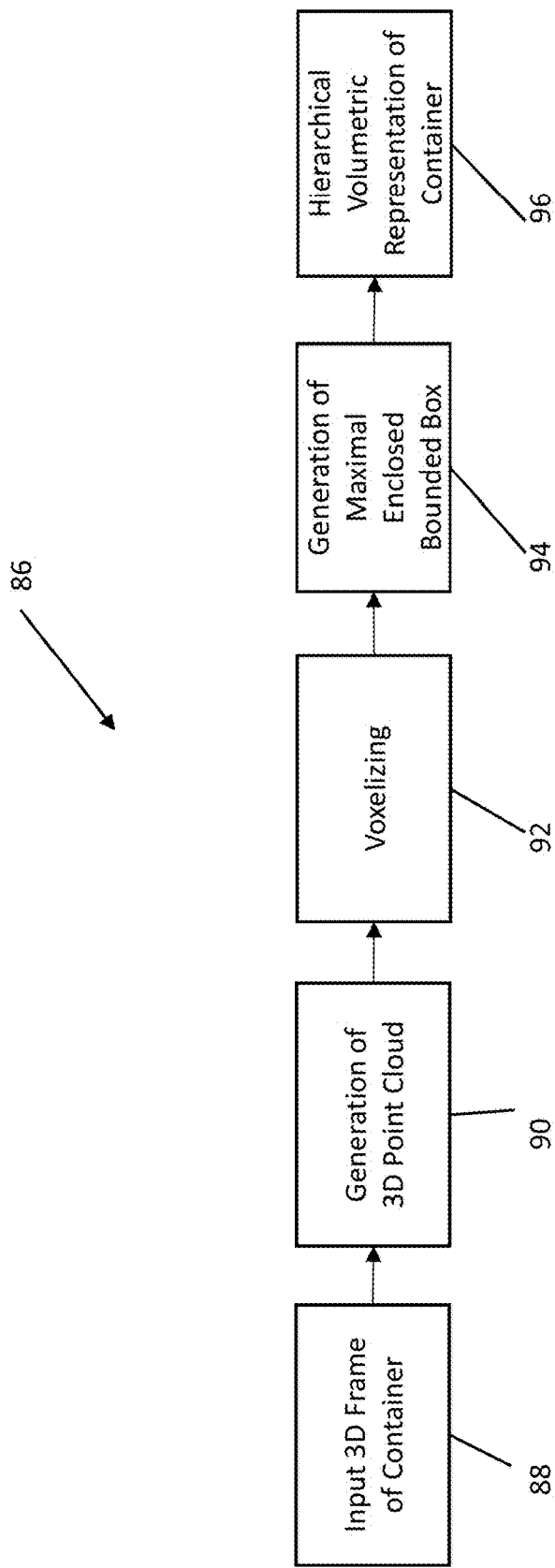
FIG. 3 is a block diagram of an example of generating a representation of a container according to an embodiment.

Referring back to FIG. 2, block 58 also generates a box representation of the container based on the maximal enclosed bounded box ("bounded box") that can be accommodated into the container or into a volumetric subset of the container. As illustrated in FIG. 3, the maximal enclosed bounded box may be generated at processing block 94. In one example where the container has a box-like interior, the bounded box may simply be the largest box that may be placed inside the container. In addition, processing block 96 may generate a hierarchical representation of the interior of the container, indicating the sizes and shapes of regions that are occupied and of regions that are available to be occupied by an item.

Referring back to FIG. 2, the volumetric representation and box representations of the container are passed to a packing algorithm at processing block 60.

The second branch of the method 50 begins at illustrated processing block 72, wherein the data of the items may be used to construct models of each of the items. In one example, the item modeler 26 (FIG. 1), discussed above, may be used to construct respective models of each of the items. The models may be in the form of a point cloud, depicting the exterior surface of each of the items, or the models may be of another form suitable for constructing a model of exterior surfaces, accessible interior surfaces, and/or interior space of the items.

Additional sources of information that may be useful in the construction of the model may be provided by processing block 74. The sources of information may include data provided by a manufacturer of the items, data derived from handmade mappings of the items, barcode scanner data, item blueprints, data provided by an IMU, and/or any other models that may be available of the items (e.g., on storage, available over the Internet, etc.). The sources of information may be combined at block 72 with the data from block 52 to generate a model of the exterior of each item. The model may reflect a size and a shape of exterior surfaces of a given item, and/or any interior surfaces (e.g., concave surfaces) that may be accessible from outside of the item and into which other items may be placed.

Processing block 76 generates volumetric and box representations of each item based on the model generated at block 72. In one example illustrated in FIG. 4, a method 98 to generate volumetric and box representations may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

In the illustrated method 98, a 3D frame of the item may be provided at processing block 100. Processing block 102 uses the data provided by the frame to generate a 3D point cloud model of the item. Often, the number of data points presented by the 3D point cloud model may tax available computational resources. Thus, it may be useful to reduce a size of a data set used in the model of the item. Notably, processing block 104 reduces the size of the data set used to model the item by voxelizing the 3D point cloud. In one example, processing block 92 may be implemented by the item voxelizer 32 (FIG. 1), discussed above. Thus, instead of being presented in terms of large numbers of individual points corresponding, for example, to the outer surface, the volume, or the interior surface of the item, the model may be built up of voxels representing groups of exteriorly accessible such points (e.g., mainly of the surface of the item).

As noted above, a size of a voxel may be determined by the available computational resources and/or the complexity of the item being modeled. The task of performing further computations on the model may become computationally simpler at the potential expense of some loss of fine granularity when voxels are used rather than individual points. In some settings, such as where the item may be of simple form and the computational resources on hand are extensive, an embodiment may omit, bypass, and/or ignore voxelizing the item.

Processing block 106 generates a minimal enclosing bounding box (MEBB) of the voxelized item. The MEBB bounds the item subject to a constraint, such as a constraint requiring that the volume of the MEBB be minimized or as close to a minimum volume value as the computational resources on hand permit. Thus, the MEBB may be considered a smallest box into which one may pack an item without disturbing (e.g., crushing or bending) the item. Further information concerning the determination and use of bounding boxes, including MEBBs, is included in a paper to Barequet et al. entitled "Efficiently Approximating the Minimum-Volume Bounding Box of a Point Set in Three Dimensions," *Journal of Algorithms* Vol. 38, Issue 1, January 2001, 91-109.

The voxels generated at block 104 may not, in general, be aligned with respect to sides of the MEBB generated at block 106, which can make subsequent calculations (e.g., calculations involving a spatial manipulation of an item, etc.) more difficult. Processing block 107 re-voxelizes the item to align the sides of the voxels with the sides of the MEBB, which may simplify subsequent calculations. In one example, the alignment may be implemented with respect to a Cartesian coordinate system (e.g., Z, Y, Z coordinates) natural to the MEBB Processing block 108 may generate a hierarchical representation of the item. For example, block 108 may indicate and quantify areas in space that are occupied by the item. In addition, block 108 may indicate and quantify accessible interior (e.g., concave) regions that may be available to be occupied by another item.

Figure 4:
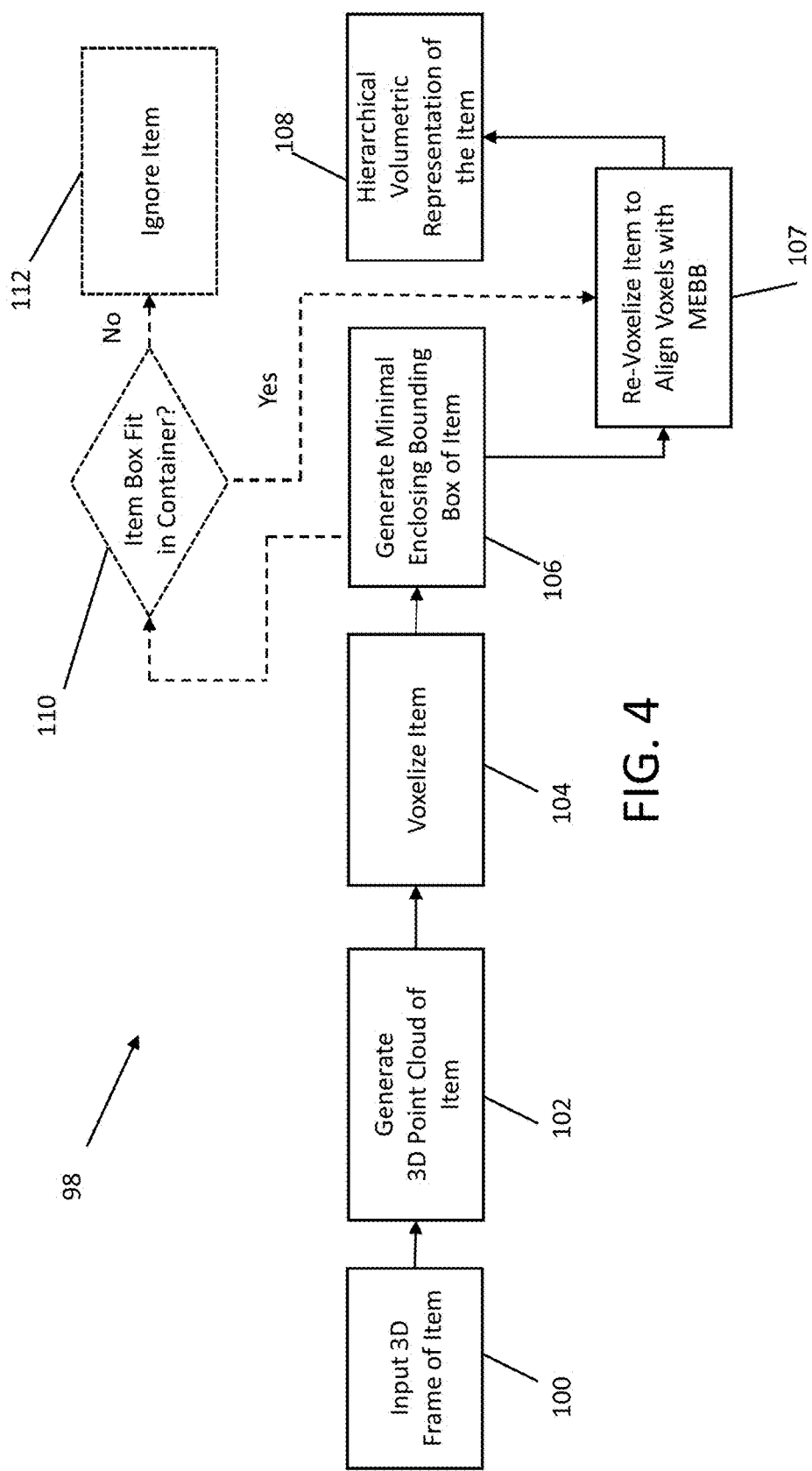
FIG. 4 is a flowchart of an example of a method of generating a representation of an item according to an embodiment.

In one embodiment of the illustrated method 98, shown in broken line in FIG. 4, items may be tested to see if they are too large to fit into the container. For example, when a MEBB has been generated at block 106, processing block 110 determines if the item is too large to be fitted into the container by comparing the size and the shape of the MEBB of the item to the size and the shape of the bounded box of the container. Additionally, an item that does not fit into the container in one orientation may fit in another.

To test for a possibility of no fit, the item may be rotated 90 degrees, 180 degrees, or 270 degrees about any of its principal axes to determine if a fit may occur. If the item is too large, the item may be ignored. In one example, an item that is too large may be removed from consideration for placement into the container at processing block 112. If, however, the item is not too large, control passes back to block 107 for re-voxelizing the item and the method 98 may proceed as before.

Returning back to FIG. 2, the output of block 76 in FIG. 2 is a representation of the item, contained within an MEBB. It is noted that the MEBB is a mathematical construct and not a physical box, although the items themselves may be physical boxes (e.g. shoe boxes that hold shoes).

Processing block 78 determines whether it is desired to consolidate the items, for example by merging the items together. In some circumstances, consolidation may not be required or possible. For example, when the items themselves are pre-packaged in sealed boxes (e.g., shoes being shipped in shoe boxes), it may be acceptable to pass along MEBBs of the individual sealed boxes to the packing algorithm at processing block 60.

On the other hand, if processing block 78 determines that further consolidation of the item is desired and/or appropriate, then processing block 80 attempts to combine individual items together by testing whether the items may be merged into one MEBB The mathematics utilized in one aspect of embodiments is discussed below.

For a given object (e.g., a container, an item, etc.) a Free Space (FS) function may refer to a measure of the degree to which a given item occupies its associated MEBB. In addition, a merger criterion may be defined in terms of the mathematical relationship among values of the FS function for individual items/bounding boxes relative to a FS value computed for a union of the items into a bounding box. In some embodiments, the bounding box may be a MEBB of one of the items to start, and in other embodiments the bounding box may be a newly computed MEBB for the two items combined together.

A number of FS functions and merger criteria may be used in embodiments. According to one embodiment, the FS function may be a Normalized Volume (NV) function which may be defined as the ratio of the volume of an item to the volume of the MEBB of the item:

$$NV(I) = vol(I)/vol(MEBB(I)) \qquad (Eqn. 1)$$

where I is the item, vol(x) is a function that computes the volume of its argument, and MEBB(x) is a function that computes an MEBB for its argument x (e.g., item I). By this measure, an NV value of 1 would be optimal and lesser values closer to 0 would indicate a poorer utilization of space.

A merger criterion to determine whether to merge a combination of two items, i and j, into a single MEBB (e.g., that may belong to one of the items, or that may be a new MEBB) may then be:

$$0.5(NV(I_i) + NV(I_j)) < NV(I_i \cup I_j) \qquad (Eqn. 2)$$

If Eqn. 2 evaluates to "True," then the merger of items $I_i$ and $I_j$ is spatially favorable over keeping the items separate, and merger may occur (i.e., the possible combination may proceed to become a merger of the items).

According to another embodiment, the FS function may be a Free Space Utilization (FSU) function which may be defined as a difference between the volume of an MEBB of the item and the volume of the space that may be used by the item:

$$FSU(I) = vol(MEBB(I)) - vol(I) \qquad (Eqn. 3)$$

where I is the item, vol(x) is a function that computes the volume of its argument (here, an item, a bounding box, or more generally, an object), and MEBB(x) is a function that computes the bounding box of item x. The FSU function returns non-negative values, and it is zero for all items that are themselves boxes or convex objects that may be enclosed into a tight box without empty voxels. In general, a low value of FSU indicates better utilization of space, with a value of 0 being optimal. Higher values of FSU indicate poorer utilization of space.

In order to improve total free space utilization in a container, a greedy approach to combine objects may be used. While this approach may be used with any of the FS functions and merger criteria discussed above, they will be explained in greater detail with respect to the FSU function and merger criteria. In the greedy approach, pairs of items are merged into a single MEBB if the FSU of the combined items is less than or equal to the sum of FSUs of the separate items, each in its own MEBB A test that may be used as a merger criterion to determine whether to merge a combination of two items, i and j, into a single MEBB may include:

$$FSU(I_i) + FSU(I_j) > FSU(I_i \cup I_j) \qquad (Eqn. 4)$$

The illustrated method 50 may seek to minimize the FSU of the union of any two items by merging them. In some embodiments, and depending on the available computational resources, the method 50 may be extended to cover the union of any subset of items.

In one embodiment, an iterative greedy approach may be used to find items to combine. For example, the items may be sorted by the volume of their respective MEBBs, and pairs of items may be combined into a single bounding box iteratively, over the items $I_i$ from large to small, for each item $I_j$ that has not yet been considered. The iterative greedy approach may be repeated until the total FSU of the merged items stops to decrease.

Pseudo code for one implementation of an algorithm to merge items is presented below:
Input: N items sorted by the volume of their MEBB
1: For i=1 to N
2: For j=i to N
3: Find best union Ii∪Ij which minimizes FSU(Ii∪Ij)
4: If FSU(Ii)+FSU(Ij)>FSU(Ii∪Ij)
5: then: Merge Ii=Ii∪Ij
6: Repeat until no further merging take places.

Figure 5:
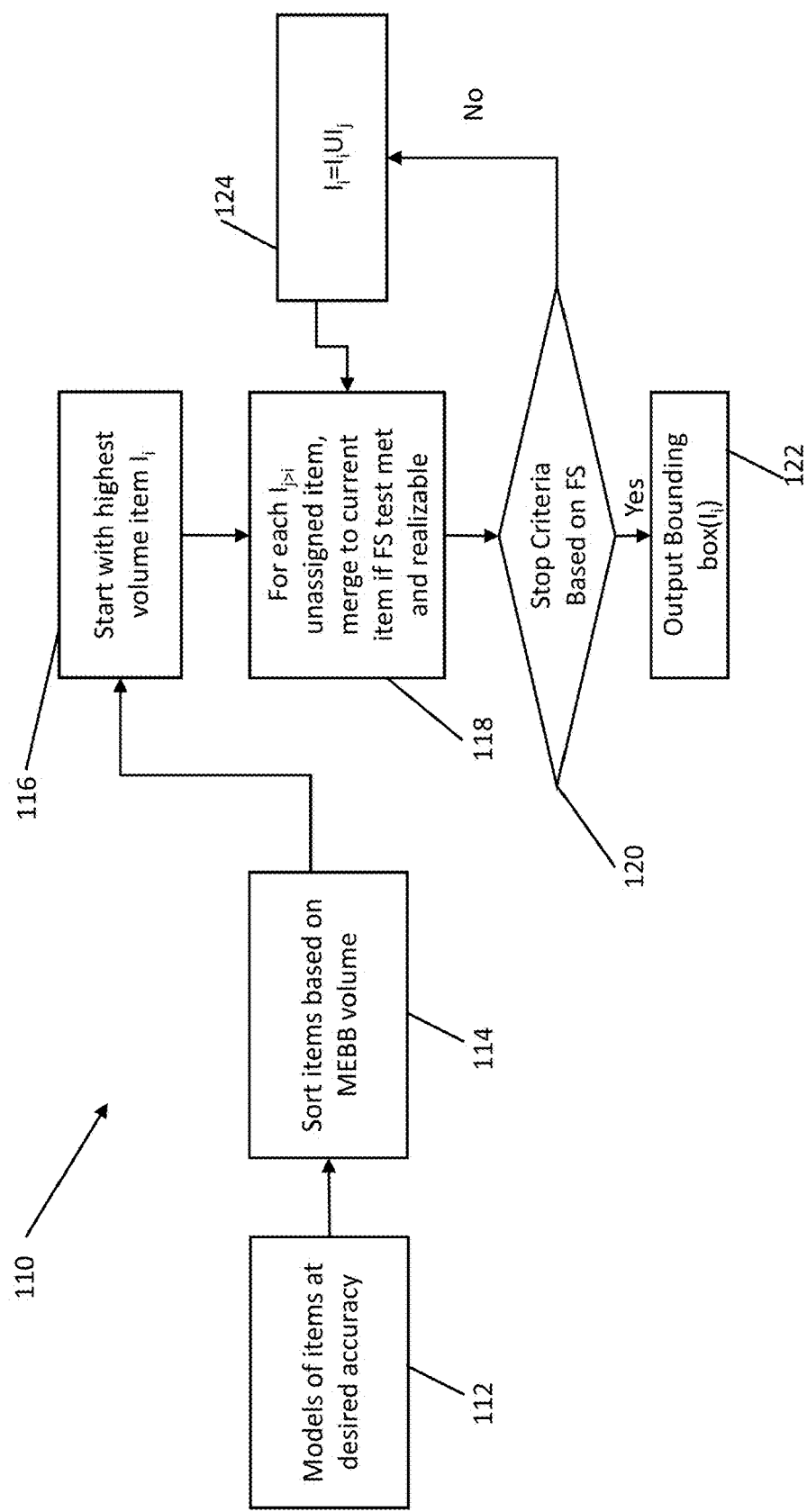
FIG. 5 is a flowchart of an example of a method of merging objects according to an embodiment.

FIG. 5 shows a flowchart of a method 110 to determine whether to merge two items together. The method 110 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Models of items that have a predetermined level of accuracy may be made available by processing block 112. Processing block 114 sorts the items based on the volumes of each item's respective MEBBs. Processing block 116 selects a highest volume available item Ii. Processing block 118 merges each unassigned item to the current item I, provided that the merge results in a value of merged FSU that is no greater than the sum of the individual FSU values of the items and provided that the merger is physically realizable.

The method of fitting one item into another item's MEBB (or into a newly computed MEBB) may generally entail consideration of both translating one item into another item's MEBB, and orienting one item with respect to another. In some circumstances, an item may not be translationally fitted into a region of space such as an MEBB containing an item while the item is in one orientation notwithstanding favorable FSU calculations. And yet, it may be that in another orientation, possibly utilizing a different translation, the item may be fitted into a region of space such as an MEBB that contains or that is to contain another item. Processing block 118 may search for a favorable translation and orientation by rotating items and their respective MEBBs to determine if a fit may occur (e.g., if an item may be translated into the MEBB of another item in a physically realizable manner).

In one embodiment, an item and its respective MEBB may be rotated by 90 degrees, 180 degrees, or 270 degrees about any of the three principal axes of the MEBB in search of an orientation that fits. Translation may generally be at a granularity of a single voxel, or integral multiples thereof. If a favorable orientation and translatory motion can be found, then merger may proceed if the FSU calculations and merger criterion warrant the merger. If a fit cannot be found, then there may be no merger, notwithstanding a favorable FSU calculation. In some embodiments, determining the feasibility of a fit may be made after FSU calculations, and in other embodiments, determining the feasibility of a fit may be made prior to FSU calculations.

Processing box 120 determines whether stop criteria (based on the FSU) have been met, such as a desired measure of consolidation or improvement in spatial overall utilization. If the criteria are met, then processing block 122 outputs the bounding box L for the now merged combination, which is then to be considered as one of the items to be packed in the container. In one embodiment, the bounding box L may be the MEBB of the i-th item. In another embodiment, a new MEBB of the combined items may be computed, and merger may occur if the volume of the new MEBB is no greater than (and preferably less than) the sum of the volumes of the MEBBs of each of the items prior to merger. If, on the other hand, it is determined at processing block 120 that the stop criteria are not met and that further consolidation of the packing of items may be desired and/or appropriate, then the MEBB for $I_i$ is set at processing block 124 to be the union of $I_i$ and $I_j$, (i.e., $I_i$ is now to be considered as containing both the item(s) previously in $I_i$ alone along with the item(s) previously in $I_j$). The merged item may be then fed back to processing block 118 for consideration of merger with further items. The illustrated method 110 may be extended to include objects generally, such containers alone, containers and items, and aggregations of any combination of items and containers.

Figure 6:
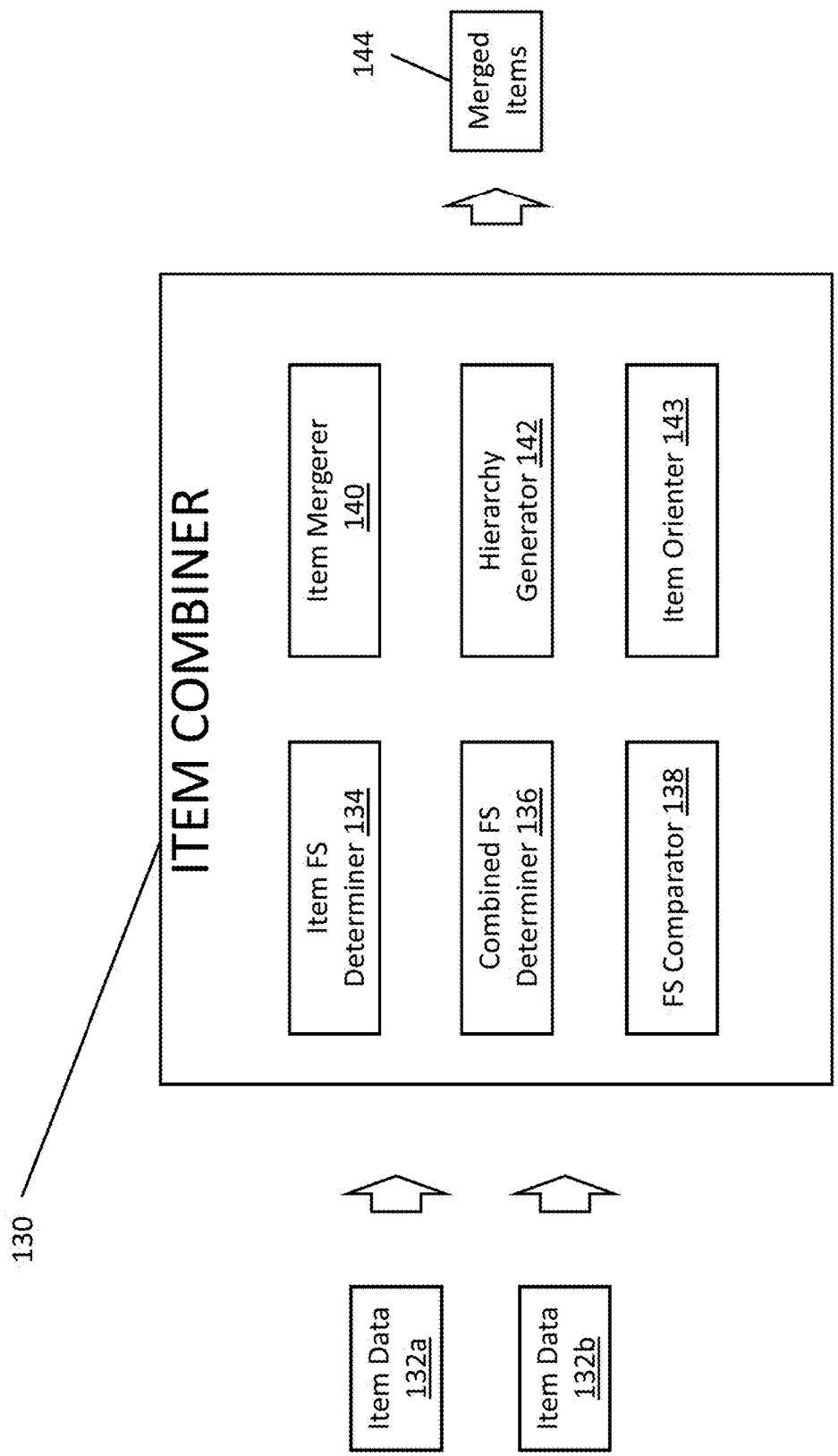
FIG. 6 is a block diagram of an example of an item combiner according to an embodiment.
Figure 7:
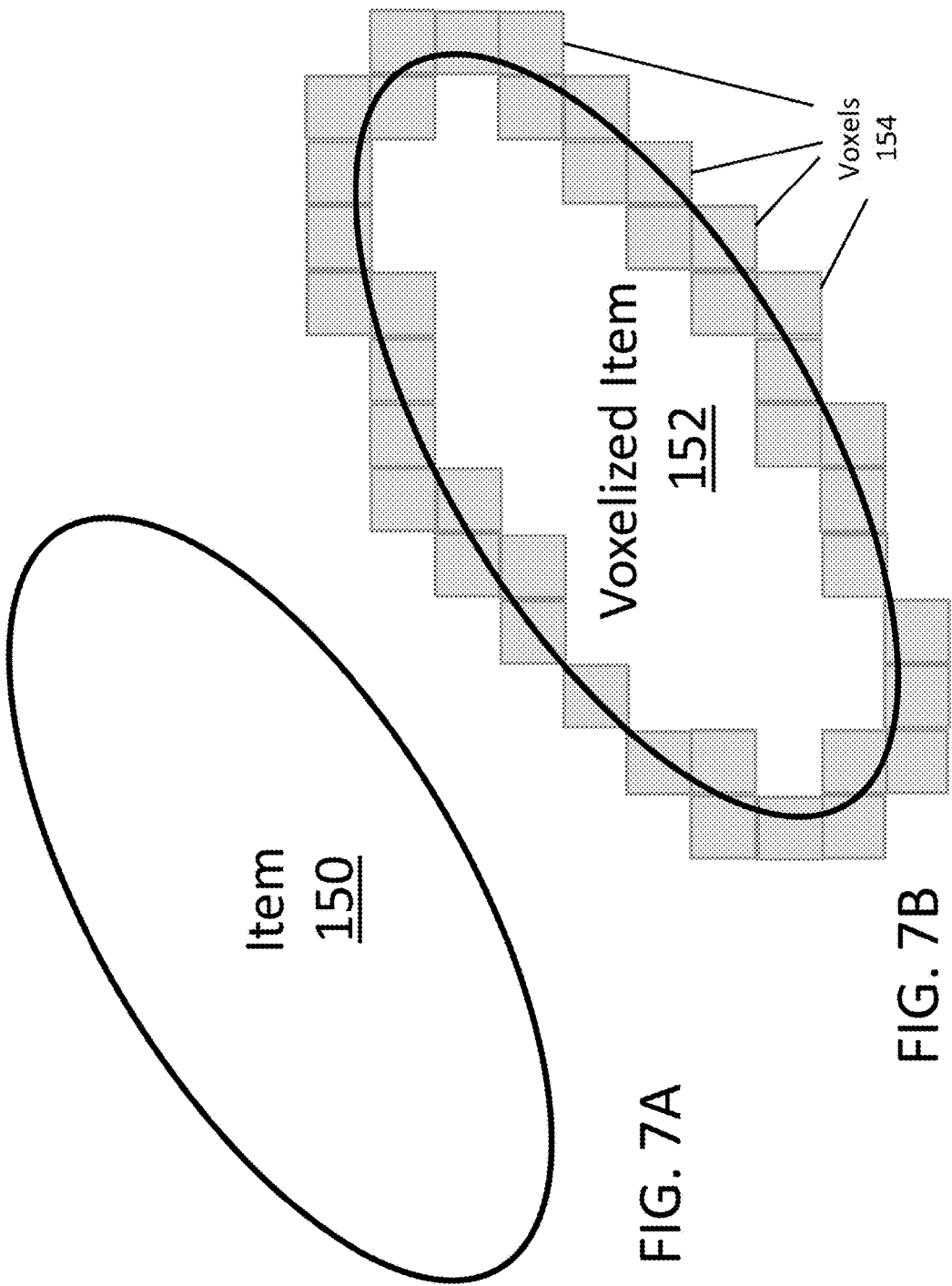
FIG. 7A is an example of an item according to an embodiment.
FIG. 7B is an example of the item in FIG. 7B shown in a voxelized form according to an embodiment.

FIG. 6 shows an embodiment of an item combiner 130 that may be used to conduct pair-wise comparisons of respective FS values for items and determine whether the items should be merged. The illustrated item combiner 130 may generally implement one or more aspects of the method 110 (FIG. 5), already discussed. In the illustrated example, item data 132a and item data 132b, corresponding to two respective items, may be passed to the item combiner 130. Item FSU determiner 134 may calculate an FSU of individual items or merged items. Combined FSU determiner 136 computes the FSU of a combination of items under consideration for merger, and FSU comparator 138 compares the FSU of the combination to the sum of the FSU values for each respective item, as in equation 2. If the combination is favorable (e.g., in the case of an embodiment utilizing the FSU function as its FS function, the combination at least does not result in an increase in the FSU value) and physically realizable, then the two items may be merged together by item mergerer 140.

When the item merger 140 determines that the two items cannot be merged together in one orientation (e.g., due to physical constraints of size), then item orienter 143 varies the orientation of the smaller of the items by rotating the smaller item 90 degrees, 180 degrees, or 270 degrees with respect to the principal axes of the MEBB of the smaller item to see if a fit may occur. If so, the items may be merged in the selected, fitable orientation (e.g., most tightly fitted orientation, most space saving orientation, etc.). If not there may be no merger. In some embodiments the item mergerer 140 may also compute a translation to insert a smaller of the two items into a region of space partly occupied by the larger item. In other embodiments, the item orienter 143 may compute the translation.

A hierarchy generator 142 may provide a hierarchical representation of an item, such as an octree, that may be computed to detect empty parts of the MEBB (e.g., parts of the MEBB of the item that are not occupied by the item itself) and/or to determine empty space available for use in consolidating a plurality of items into one MEBB. The item combiner 130 provides a listing of merged items 144 that may be passed to a packing algorithm, such as the packing algorithm at processing block 60 (FIG. 2), discussed above.

Additional technical approaches may be used to facilitate determinations of item mergers. Referring back to FIG. 2, for example, processing block 84 may provide item recognition data to assist in making determinations of whether to merge two items. Item recognition data may, for example, include image analysis data. Item recognition data may use heuristics to determine likely item attributes that may be of use in generating packing sequence instructions, such as item fragility or preferred orientation. In addition, processing block 62 may provide additional constraints on the manner in which items may be packed together. The constraints may include limitations on weight, weight distribution, item orientation, item fragility, location preferences, temperature, loading/unloading scheduling, item compatibility, etc. In one embodiment, block 84 may provide image analysis data for the items to facilitate the action of the packing algorithm at block 60.

The packing algorithm at block 60 may take the items, including items that may have been consolidated through merger into a single MEBB, and generate a detailed packing plan for packing the items into the container (or other storage space) that is output at processing block 66. The final placement of the items may be preceded by packing items into physical containers (e.g., cardboard boxes, coolers, plastic containers, shipping containers, etc.), or not, and may be tailored to the available labor or machinery available to pack the items into the container. The packing algorithm may be a heuristic packing algorithm. In one example, a wall-filling 3D container packing problem algorithm may be employed. Further information regarding one example of an algorithm may be found in a paper to Lim et al. entitled "3D Container Packing Heuristics," *Applied Intelligence* 22, 125-134, 2005.

FIGS. 7A-11C illustrate aspects of an item, the item in voxelized form, and the voxelized item located within a bounding box according to an embodiment. For ease of illustration, the item it is presented in two dimensions. However, it should be understood that embodiments may be readily extended to three dimensions.

Figure 8:
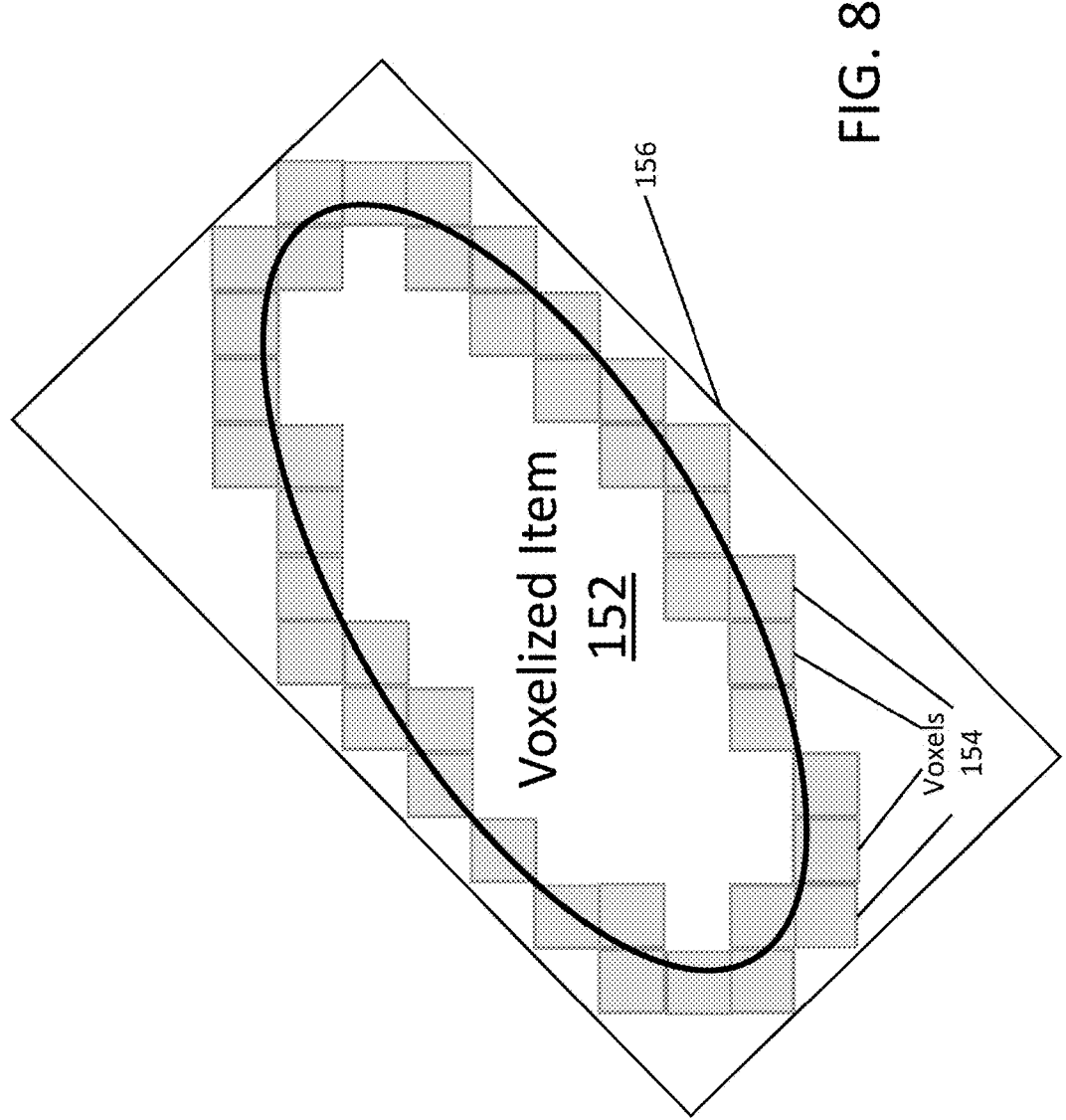
FIG. 8 is an example of the voxelized item in FIG. 7B located within a bounding box according to an embodiment.

FIG. 7A shows an item 150 in the general shape of an oval. The item may, for example, be one item among many items that are to be packed together in a storage container, along with a plurality of other items. FIG. 7B shows the item 150 as a voxelized item 152, defined in terms of voxels 154. Although the voxels are here shown as two-dimensional squares, in three dimensions the voxels would be cubes of some convenient and/or predetermined dimension. FIG. 8 shows the voxelized item 152 contained within a respective MEBB 156. The voxels 154 typically may not have a computationally convenient orientation with respect to the sides of the MEBB 156.

Figure 9:
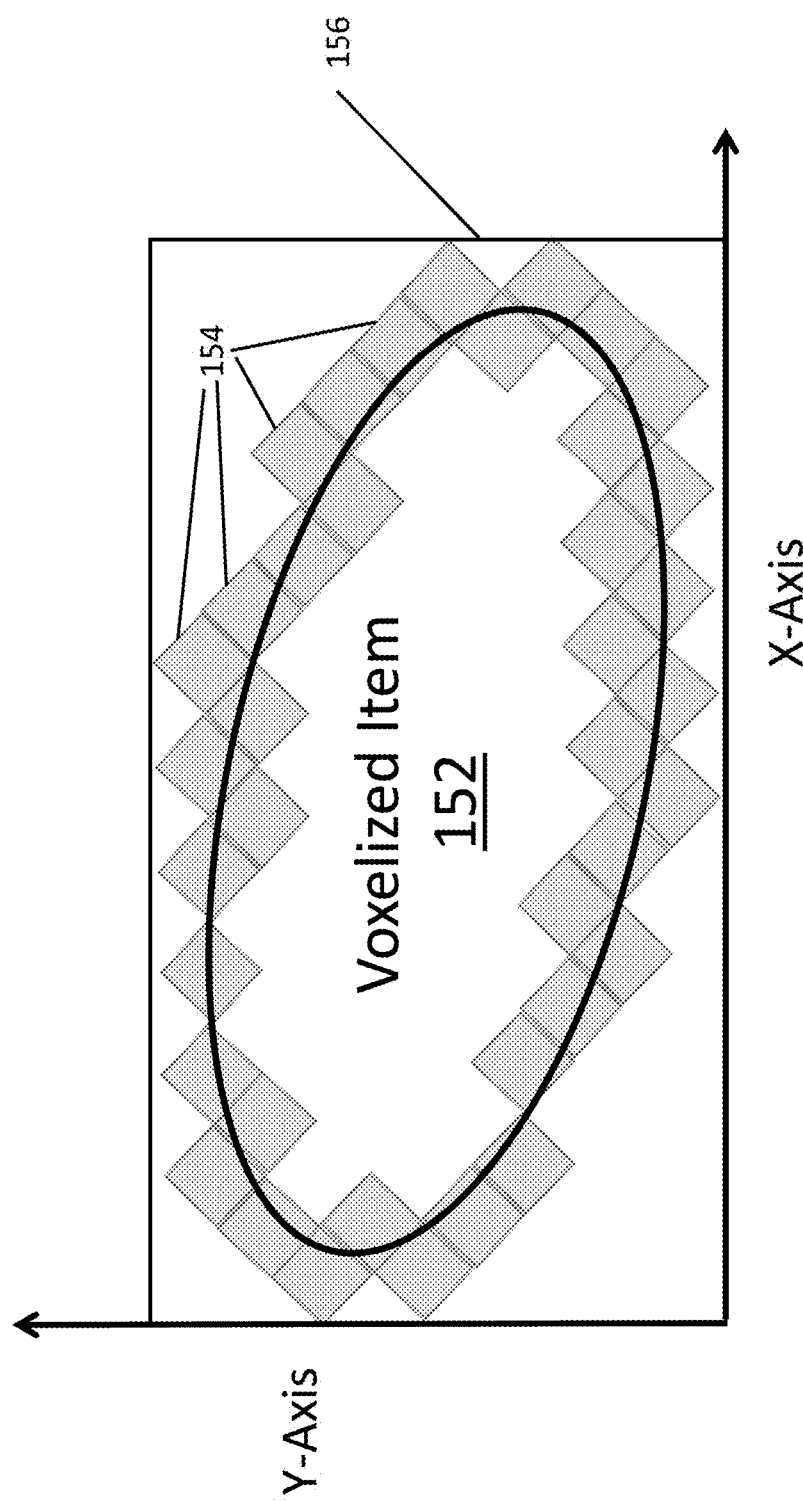
FIG. 9 is an example of the voxelized item and the bounding box in FIG. 8 aligned with respect to a pair of reference axes according to an embodiment.

FIG. 9 illustrates an example of a voxelized item and a bounding box aligned with respect to a pair of reference axes according to an embodiment. As shown in FIG. 9, the MEBB 156 may be oriented along Cartesian coordinate X-Y axes (a Z-axis is included in the 3D case) that may be suitable both for a box shape and that may be suitable for the bounded box of the container into which the items may ultimately be placed. In general, the voxels 154 may be oriented along one another's sides, but the voxel sides may not have a computationally convenient orientation with respect to the MEBB.

Figure 10:
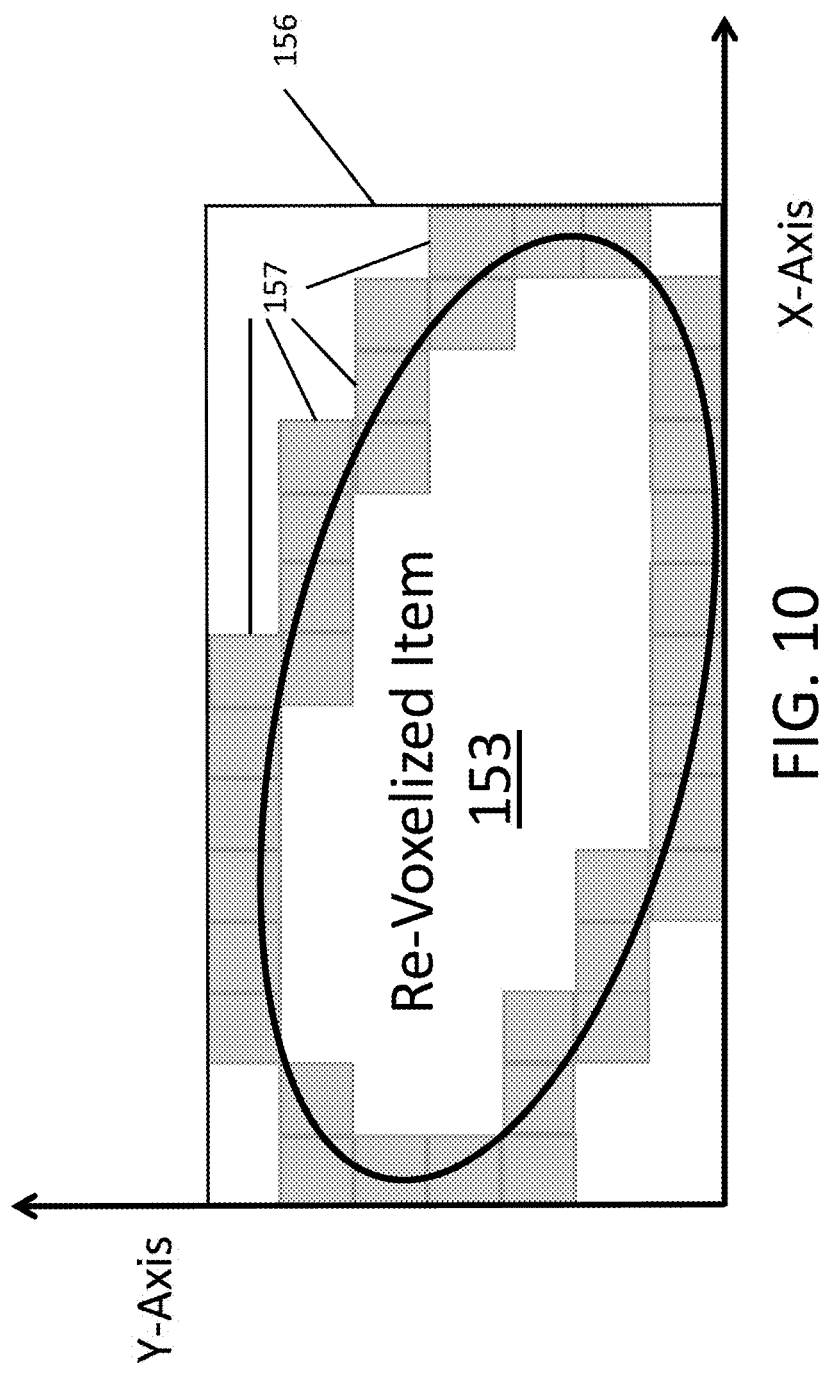
FIG. 10 is an example of a re-voxelized item in a bounding box according to an embodiment.

FIG. 10 illustrates a re-voxelized bounding box according to an embodiment. As shown in FIG. 10, the voxelized item 152 may be re-oriented to provide a re-voxelized item 153. Notably, the orientation of the voxels 157 has been shifted so that the sides of the voxels may be in alignment with the coordinate axes of the MEBB 156.

Figure 11A:
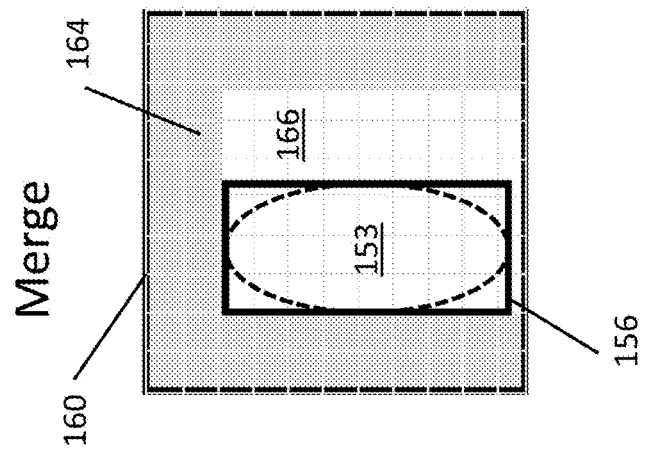
FIGS. 11A-11C are an example of a merger of two items according to an embodiment.
Figure 11B:
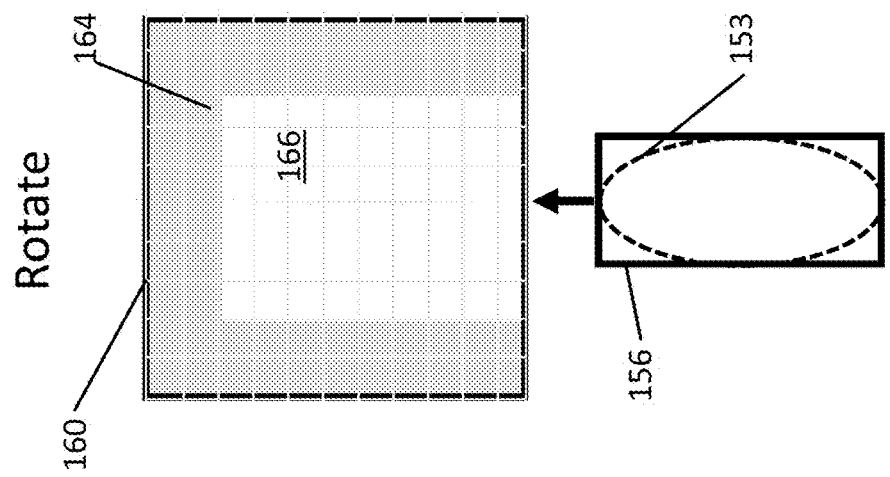
Figure 11C:
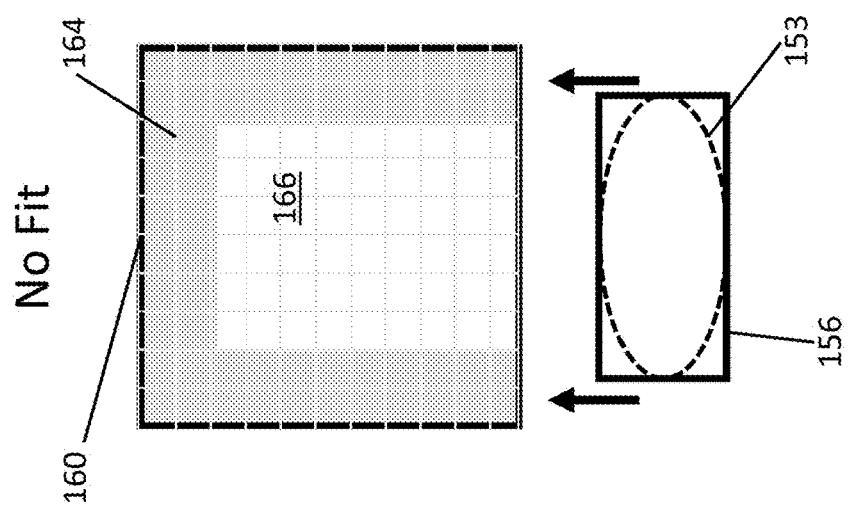

FIGS. 11A-11C illustrate another aspect of a merger process according to an embodiment, in which determining whether to merge two or more items also includes varying the orientation of an item with respect to another item so that merger may be physically realizable and/or favorable. The upper half of FIG. 11A shows an MEBB 160 that contains a first item 164. The shape of the first item 164 may be such that the MEBB 160 includes some free space 166 that may be available to receive another item. The lower half of FIG. 11A shows the re-voxelized item 153 and its MEBB 156, having a generally horizontal orientation with respect to the free space 166. Were the MEBB 156 to be vertically moved in the direction of the arrows towards the free space 166, the MEBB 156 would be blocked by the first item 164.

In some embodiments, such as when the item orienter 143 (FIG. 6), discussed above, is utilized, a smaller MEBB and its associated item may be reoriented about the MEBB coordinate axes either 90 degrees, 180 degrees, or 270 degrees in search of a fit with respect to a larger MEBB into which merger is sought. In FIG. 11B, for example, the MEBB 156 has been rotated 90 degrees to be inserted into the free space 166 of the MEBB 160. Thus, merger is accomplished in a physically realizable manner, as illustrated in FIG. 11C.

Figure 12A:
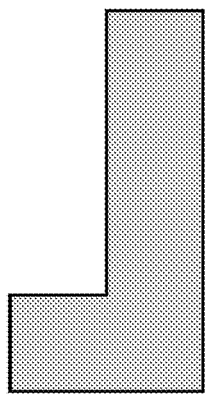
FIGS. 12A-12B are examples of two identical items according to an embodiment.
Figure 12B:
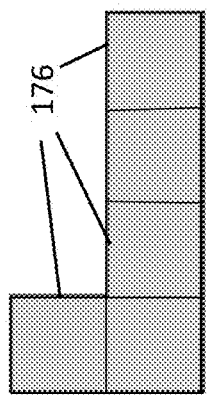

In the example shown in FIG. 11C, the merged items are seen to fit together into one of the MEBBs of one of the items. However, embodiments may be extended to include merging items into newly computed MEBBs. For example, in another embodiment, it may be the case that the items are merged but do not fit in any item's MEBB. Provided the spatial utilization of the merged pair is favorable, the merger may proceed, and a new MEBB may be computed for the merged pair. As shown in FIGS. 12A-12B, item A and item B are shown in two dimensions and are identical to one another for ease of explanation. It should be understood, however, that embodiments may be readily extended to three dimensions, and/or may be applicable to items that differ in both size and shape from one another.

Figure 13A:
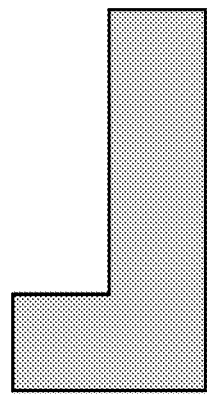
FIGS. 13A-13B are examples of the items in FIGS. 12A-12B shown in voxelized form according to an embodiment.
Figure 13B:
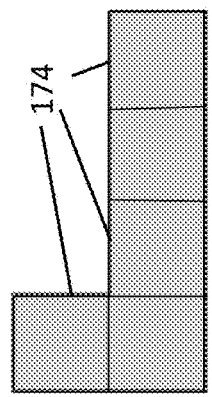

FIGS. 13A-13B show items A,B in simplified, voxelized form. FIG. 13A shows the item A as a voxelized item, defined in terms of voxels 174. FIG. 13B shows the item B as a voxelized item, defined in terms of voxels 176. The voxels are equal in size, so that in terms of voxel elements, the illustrated volume of each item is 5:

Vol(A)=5; and

Vol(B)=5.

Figures 14A, 14B:
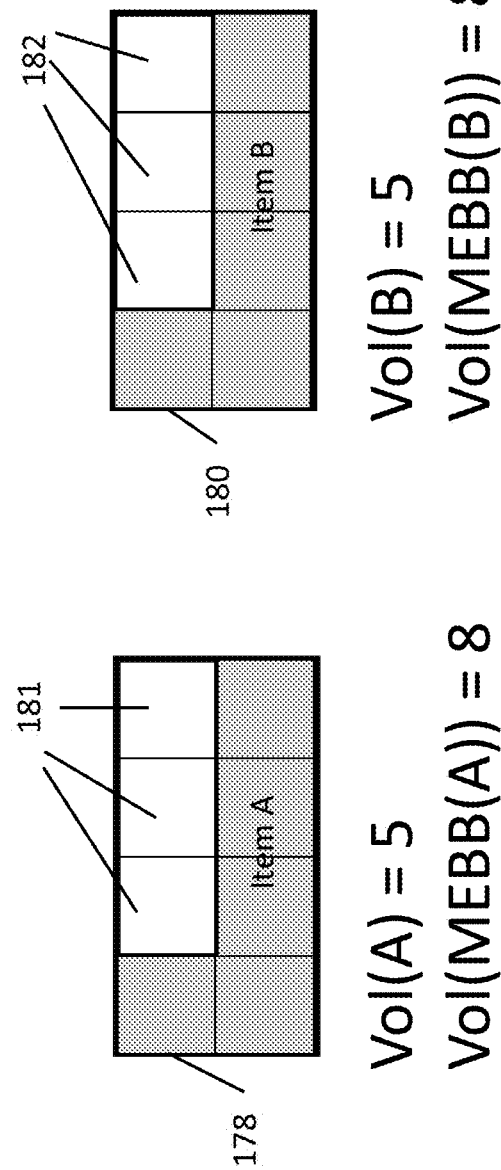
FIGS. 14A-14B is an example of the items in FIGS. 13A-13B located within respective bounding boxes according to an embodiment.

Next, as shown in FIGS. 14A-14B, an MEBB 178 is placed about item A and an MEBB 180 is placed about item B. In addition, the voxels are aligned so that their sides are in alignment with the MEBBs 178, 180, respectively. The volume of the illustrated MEBB about each item is 8:

Vol(MEBB(A))=8; and

Vol(MEBB(B))=8.

Notably, the MEBB 178 of A includes empty space 181, and the MEBB 180 of B includes empty space 182. In the illustrated example, the empty space 181 is equal in size to the empty space 182, although in general, the size and shape of empty spaces may differ.

In one example, a first item (e.g., a larger of the two items under consideration) may be held fixed while testing various combinations of oriented and translated spatial transformations Tr of a second item (a smaller item of the two items under consideration) to determine which item can be fitted into a newly calculated bounding box that takes up less space than the sum of the MEBBs of the items to start. In addition, the items may be merged together into the newly calculated bounding box as their new, joint MEBB if calculations are favorable, for example as discussed below.

FIGS. 15A-15C show item B in various orientations, differing from one another by a 90 degree counter-clockwise rotation. In one embodiment, one item may be rotated with respect to another item by 90 degrees, 180 degrees, or 270 degrees. In this example, item A may be held fixed in space relative to a coordinate system, and item B may assume various rotations and translations with respect to item A. As illustrated in FIGS. 16A-16E, various combinations of item A and item B may result from rotations of item B with respect to A and translations of the rotated item B towards item A. The depictions are illustrative of possible combinations and are not intended to be exhaustive.

Figure 16A:
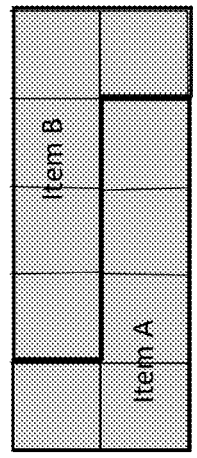
FIGS. 16A-16E are examples of various possible combinations of items according to an embodiment.
Figure 16B:
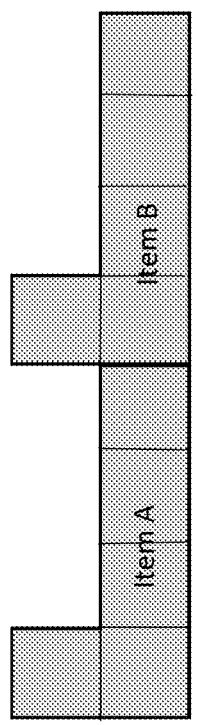
Figure 16D:
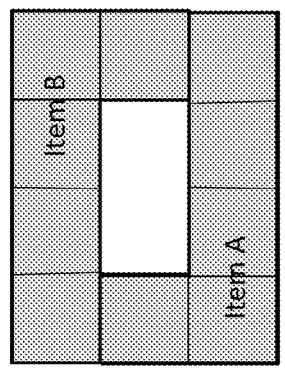
Figure 16C:
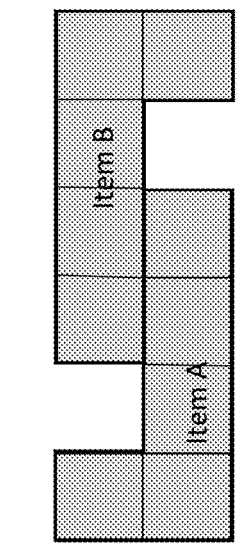
Figure 16E:
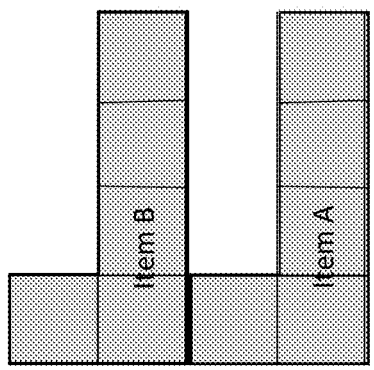
Figure 17:
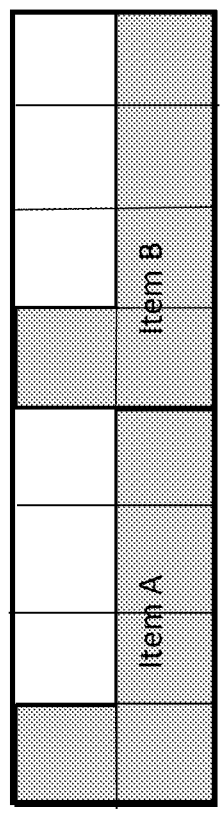
FIG. 17 is an example of a combination of items in a bounding box according to an embodiment
Figure 18:
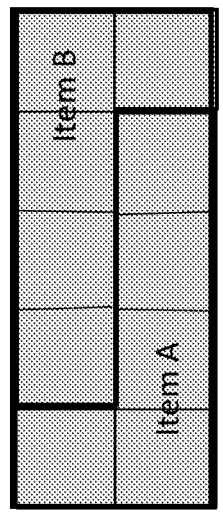
FIG. 18 is an example of a combination of items in a bounding box according to an embodiment

As shown in FIGS. 17-18, two of the combinations illustrated in FIG. 16A-16B are referred to as "comb-1" and "comb-2". In the illustrated example of FIG. 17, comb-1 has a combined item volume of 10:

$$\mathrm{Vol}(A) + \mathrm{Vol}(B) = 10.$$

Similarly, in the illustrated example of FIG. 18, comb-2 again has a combined item volume of 10:

$$\mathrm{Vol}(A) + \mathrm{Vol}(B) = 10.$$

MEBBs are then computed for each combination. Thus, in FIG. 17, comb-1 has a MEBB 184, wherein the volume of MEBB 184 is 16:

$$\mathrm{Vol}(\mathrm{MEBB}(A \cup B))_{comb-1} = 16$$

Similarly, in FIG. 18, comb-2 has a MEBB 186, wherein the volume of MEBB 186 is 10:

$$\mathrm{Vol}(\mathrm{MEBB}(A \cup B))_{comb2} = 10$$

In terms of the FSU, as shown in equation 5:

$$FSU(A)=Vol(MEBB(A))-Vol(A)=(8-5)=3$$

$$FSU(B)=Vol(MEBB(B))-Vol(B)=(8-5)=3$$

$$FSU((A \cup B)_{comb-1})=16-10=6$$

$$FSU((A \cup B)_{comb-2})=10-10=0$$

The FSU criteria, as shown in equation 6 is then evaluated, first for comb-1 depicted in FIG. 17. In this regard, we evaluate the left hand side of equation 6 for comb-1:

$$(Vol(MEBB(A))-Vol(A))+(Vol(MEBB(B))-Vol(B))= (8-5)+(8-5)=6$$

The right hand side of equation 6 for comb-1 is FSU $((A \cup B)_{comb-1})=16-10=6$. As the inequality of the criterion is not met (i.e., 6 is not greater than 6), the criterion is not met, and a merger of items A and B together into MEBB 184 is not performed for comb-1.

Other possible mergers may also be evaluated, including comb-2. In the illustrated example, the left hand side of equation 6 is the same for both combinations, but the right hand side for comb-2 is different; namely, $FSU((A \cup B)_{comb-2})=10-10=0$. In this case, the evaluation criterion is met, as 6>0, and the combination of items A and B depicted in FIG. 18B is accepted as the merger. Thus, the combination of items A and B depicted in FIG. 18B is the merger that is accepted. In general, several prospective combinations may pass the merger criterion test, in which case the combination that offers the best utilization of space is the one for which merger proceeds. Thus, for two combinations m and n that both pass the merger criterion test, m would be selected where $FSU((A \cup B)_{comb-m}) < FSU((A \cup B)_{comb-n})$.

Pseudo code for one implementation of an algorithm to merge items is presented below:
1. Given N items, sort the N items according to their MEBB volume in descending order from 1 to N (item 1 is the largest by MEBB).
2. For item i (item A)
3. holding item A fixed in space
4. for all remaining items j=i+1, i+2 . . . N, ≤size of A
5. sequentially taking the objects j (B in the example),
6. computer possible transformations of B Tr(B) using allowed rotations of 90°, 180°, and 270° and translations that are multiples of voxel size
7. for each such transformation evaluate a merger criterion for a combination of A and Tr(B) using MEBBs for each combination
8. Choose the Tr(B) that optimizes the merger criterion
9. Merge item A and Tr(B), use the MEBB for the merged items A and Tr(B)
10. Choose as B the item j that when optimally transformed provides best merger of A and B
11. Merge A with the optimal choice of B in its optimally transformed state into a MEBB for the merged items. Merger with B happens only if there is such an item B, in which case item B is removed from the list of items.
12. Repeat the above from step 2 forward beginning with the next smallest item i+1.

The merger implementation may be practiced with a number of free space functions and merger criteria, including those presented in equations 1-4.

Thus, embodiments described herein may be used to provide for consolidated packing of items into an enclosed space, whether the items are box-shaped or not, leading to relatively better space utilization. Additionally, embodiments may be used in multiple applications. For example, embodiments may be implemented as a mobile application using a handheld device such as smart phone for personal use in generating packing suggestions for placing items inside car trunk, truck, or closet where space may be limited. Embodiments may also be incorporated into dedicated handheld device for shipping companies to use in generating more optimal loading/unloading sequence of packages in their trucks. Embodiments may also be used in the field of robotics, where it the system may be incorporated into fully automatic packing solution system.

Figure 19:
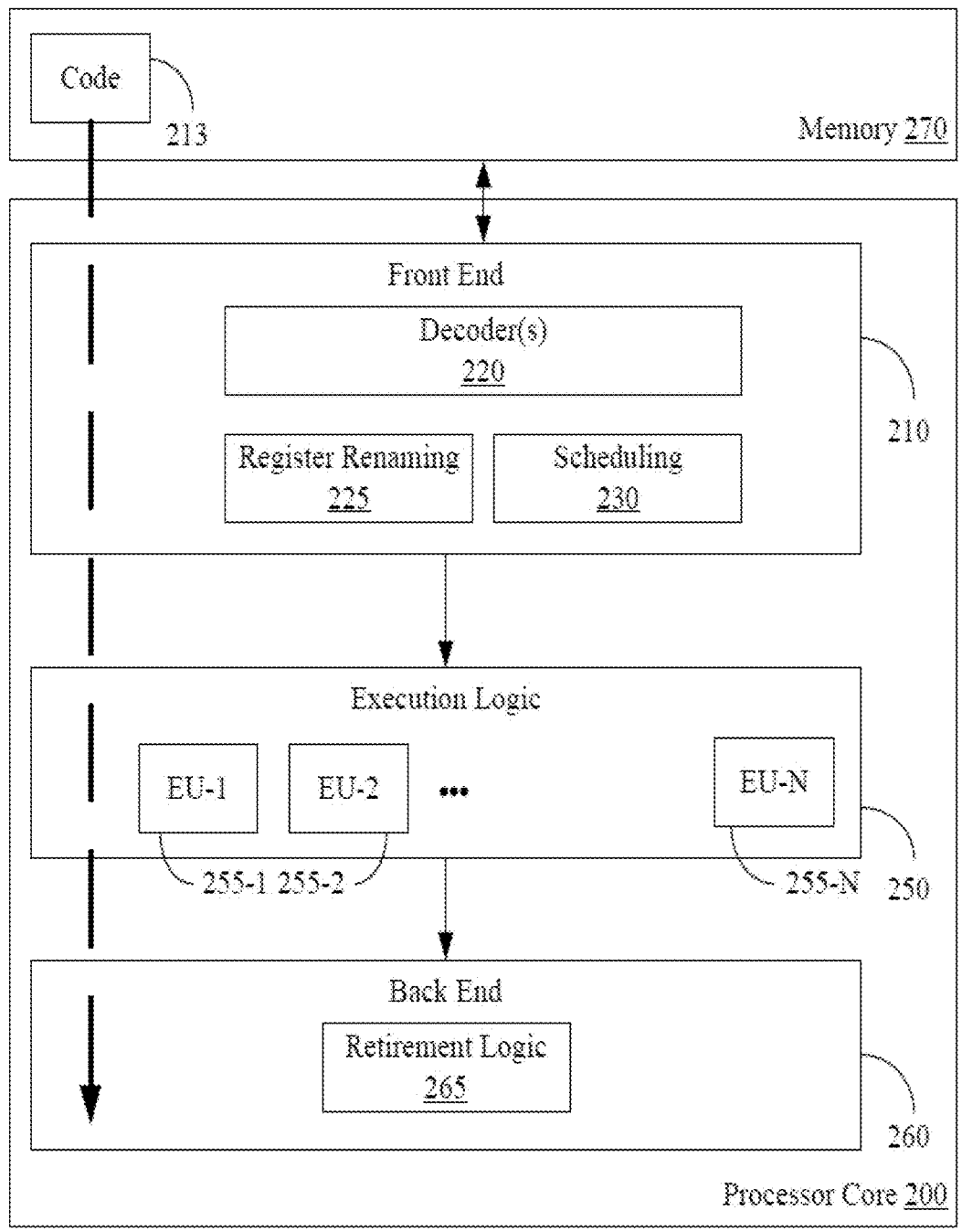
FIG. 19 is a block diagram of an example of a processor according to an embodiment.

FIG. 19 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 19, a processing element may alternatively include more than one of the processor core 200 illustrated in FIG. 19. The processor core 200 may be a single-threaded core or, for at least one embodiment, the processor core 200 may be multithreaded in that it may include more than one hardware thread context (or "logical processor") per core.

FIG. 19 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the methods already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 19, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 20:
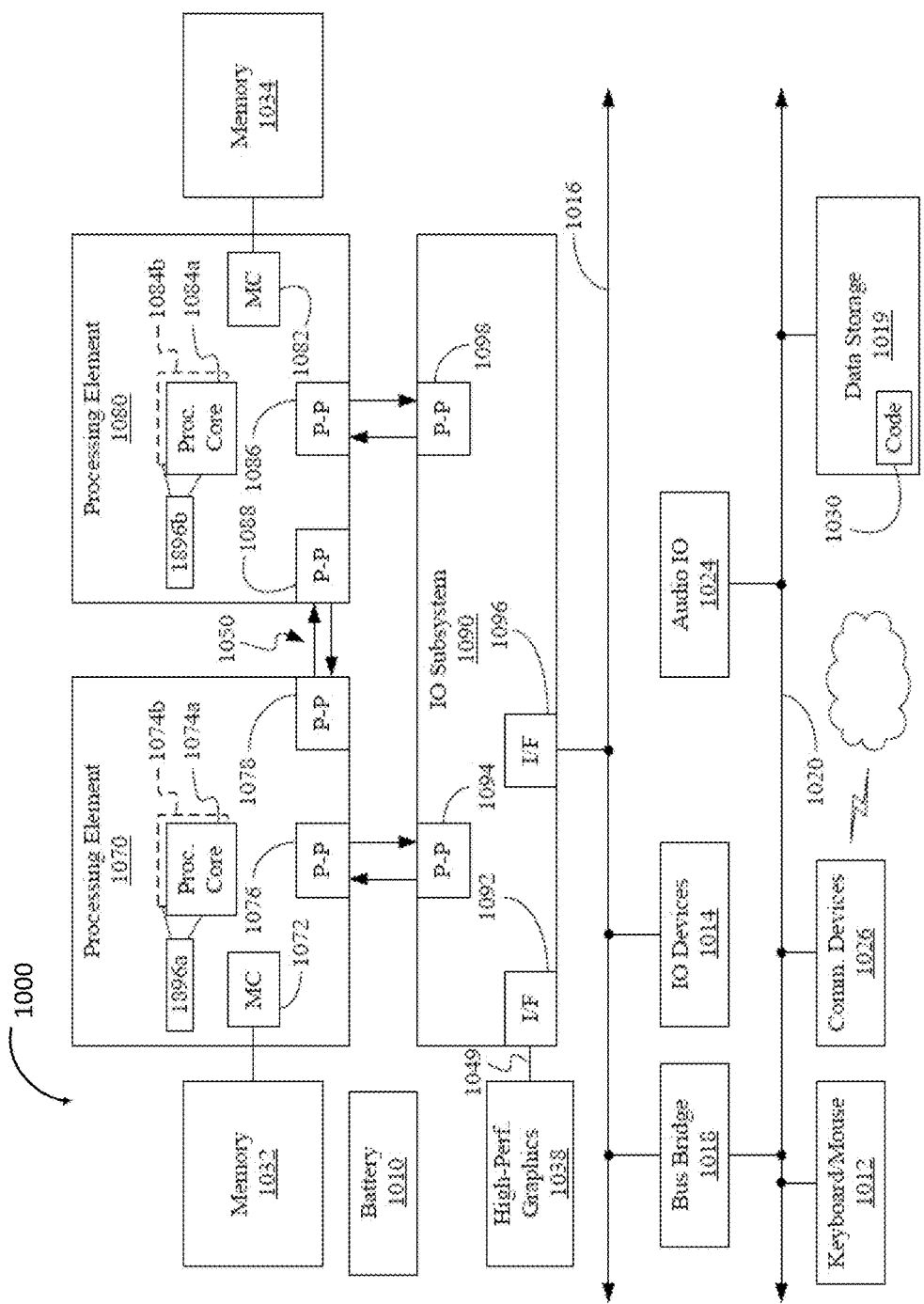
FIG. 20 is a block diagram of an example of a computing system according to an embodiment.

Referring now to FIG. 20, shown is a block diagram of a computing system 1000 embodiment in accordance with an embodiment. Shown in FIG. 20 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 20 may be implemented as a multi-drop bus rather than point-to-point interconnect.

As shown in FIG. 20, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 19.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 20, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 20, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 20, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 22 (FIG. 2), the method 32 (FIG. 4) and/or the method 44 (FIG. 5), already discussed, and may be similar to the code 213 (FIG. 19), already discussed. Further, an audio I/O 1024 may be coupled to second bus 1020 and a battery 1010 may supply power to the computing system 1000.

Note that other embodiments are contemplated. For example, instead of the point-to-point architecture of FIG. 20, a system may implement a multi-drop bus or another such communication topology. Also, the elements of FIG. 20 may alternatively be partitioned using more or fewer integrated chips than shown in FIG. 20.

ADDITIONAL NOTES AND EXAMPLES

Example 1 may include a system to determine efficient packing for objects, comprising at least one sensor to provide sensor data to an object modeler that is to generate a digital three-dimensional (3D) model of each of a plurality of real objects, an object boxer communicatively coupled with the at least one sensor to generate a bounding box for each of the plurality of real objects, and a packing plan generator communicatively coupled with the object boxer to determine a spatially efficient packing sequence for the plurality of real objects, wherein at least one of the plurality of real objects contains at least one other of the plurality of real objects.

Example 2 may include the system of Example 1, further including an object voxelizer to approximate a size and a shape for each of the plurality of real objects in voxels.

Example 3 may include the system of any one of Examples 1 to 2, wherein one or more of the plurality of real objects is an item, and wherein the apparatus further includes an item voxelizer to approximate a size and a shape for each item, an item boxer to generate a minimal enclosing bounding box for each item and an item combiner to determine if any two or more items are mergeable into a bounding box that occupies less volume than a sum of volumes for each minimal enclosing bounding box for each of the two or more items and merge the two or more items together in the bounding box if the two or more items are mergeable.

Example 4 may include the system of any one of Examples 1 to 3, wherein the item combiner is to compute a free space (FS) value of each item with respect to each minimal enclosing bounding box for each item, and merge the two or more items into one bounding box if a merger criterion is met.

Example 5 may include the system of any one of Examples 1 to 4, wherein the at least one sensor includes a 3D sensor, and wherein the system further includes an object identifier to identify each of the plurality of real objects and acquire non-3D image data corresponding to each of the plurality of the real objects.

Example 6 may include the system of any one of Examples 1 to 5, further including a hierarchy generator to generate a hierarchical volumetric representation of each of the plurality of real objects to detect an empty part of each of the plurality of real objects.

Example 7 may include the system of any one of Examples 1 to 6, wherein one of the plurality of real objects is a storage space, and wherein the system further including a storage space boxer to generate a maximum enclosed bounded box for the storage space.

Example 8 may include an apparatus to determine an efficient packing for objects comprising an object modeler to generate a three-dimensional (3D) digital model of a plurality of real objects based on sensor data for each of the plurality of real objects, an object boxer communicatively coupled with the at least one sensor to generate a bounding box for each of the plurality of real objects, and a packing plan generator communicatively coupled with the object boxer to determine a spatially efficient packing sequence for the plurality of real objects, wherein at least one of the plurality of real objects contains at least one other of the plurality of real objects.

Example 9 may include the apparatus of Example 8, further including an object voxelizer to approximate a size and a shape for each of the plurality of real objects in voxels.

Example 10 may include the apparatus of any one of Examples 8 to 9, wherein one or more of the plurality of real objects is an item, and wherein the apparatus further includes an item voxelizer to approximate a size and a shape for each item, an item boxer to generate a minimal enclosing bounding box for each item, and an item combiner to determine if any two or more items are mergeable into a bounding box that occupies less volume than a sum of volumes for each individual minimal enclosing bounding box for each of the two or more items and merge the two or more items together in the bounding box if it is determined that the two or more items are mergeable.

Example 11 may include the apparatus of any one of Examples 8 to 10, wherein the item combiner is to compute a free space value (FS) of each item with respect to each minimal enclosing bounding box for each item, and merge the two or more items into one bounding box if it is determined that a merger criterion is met.

Example 12 may include the apparatus of any one of Examples 8 to 11, further including an object identifier to identify each of the plurality of real objects and acquire non-3D image data corresponding to each of the plurality of the real objects.

Example 13 may include the apparatus of any one of Examples 8 to 12, further including a hierarchy generator to generate a hierarchical volumetric representation of each of the plurality of real objects to detect an empty part of each of the plurality of real objects.

Example 14 may include the apparatus of any one of Examples 8 to 13, wherein one or more of the plurality of real objects is a storage space, the apparatus further including a storage space boxer to generate a maximum enclosed bounded box for the storage space.

Example 15 may include a method to determine an efficient packing for objects comprising generating, by at least one sensor, a three-dimensional (3D) digital model of a plurality of real objects based on sensor data for each of the plurality of real objects, generating, by an object boxer, a bounding box for each of the plurality of real objects, and determining, by a packing plan generator, a spatially efficient packing sequence for the plurality of real objects, wherein at least one of the plurality of real objects contains at least one other of the plurality of real objects.

Example 16 may include the method of Example 15, further including approximating a size and a shape for each of the plurality of real objects in voxels.

Example 17 may include the method of any one of Examples 15 to 16, wherein one or more of the plurality of real objects is an item, and wherein the method further includes approximating a size and a shape for each item in voxels, generating a minimal enclosing bounding box for each item, determining if any two or more items are mergeable into a bounding box that occupies less volume than a sum of volumes for each individual minimal enclosing bounding box for each of the two or more items, and merging the two or more items together in the bounding box if it is determined that the two or more items are mergeable.

Example 18 may include the method of any one of Examples 15 to 17, further including computing a free space value (FS) of each item with respect to each minimal enclosing bounding box for each item and merging the two or more items into one bounding box if it is determined that a merger criterion is met.

Example 19 may include the method of any one of Examples 15 to 18, further including identifying each of the plurality of real objects and acquiring non-3D image data corresponding to each of the plurality of the real objects.

Example 20 may include the method of any one of Examples 15 to 19, further including generating a hierarchical volumetric representation of each of the plurality of real objects to detect an empty part of each of the plurality of real objects.

Example 21 may include the method of any one of Examples 15 to 20, wherein one of the plurality of real objects is a storage space, the method further including generating a maximum enclosed bounded box for the storage space.

Example 22 may include at least one computer readable storage medium comprising a set of instructions, which when executed by an apparatus, cause the apparatus to generate a three-dimensional (3D) digital model of a plurality of real objects based on sensor data for each of the plurality of real objects, generate a bounding box for each of the plurality of real objects, and determine a spatially efficient packing sequence for the plurality of real objects, wherein at least one other of the plurality of real objects.

Example 23 may include the at least one computer readable storage medium of Example 20, wherein the instructions, when executed, cause an apparatus to approximate a size and a shape for each of the plurality of real objects in voxels.

Example 24 may include the at least one computer readable storage medium of any one of Examples 22 to 23, wherein one or more of the plurality of real objects is an item, and wherein the instructions, when executed, cause an apparatus to approximate a size and a shape for each item in voxels, generate a minimal enclosing bounding box for each item, determine if any two or more items of the plurality of items are mergeable into a bounding box that occupies less volume than a sum of volumes for each individual minimal enclosing bounding box for each of the two or more items, and merge the two or more items together in the bounding box if it is determined that the two or more items are mergeable.

Example 25 may include the at least one computer readable storage medium of any one of Examples 22 to 24, wherein the instructions, when executed, cause an apparatus to compute a free space value (FS) of each item with respect to each minimal enclosing bounding box for each item and merge the two or more items into one bounding box if it is determined that a merger criterion is met.

Example 26 may include the at least one computer readable storage medium of any one of Examples 22 to 25, wherein the instructions, when executed, cause an apparatus to identify each of the plurality of real objects and acquire non-3D image data corresponding to each of the plurality of the real objects.

Example 27 may include the at least one computer readable storage medium of any one of Examples 22 to 26, wherein the instructions, when executed, cause an apparatus to generate a hierarchical volumetric representation of each of the plurality of real objects to detect an empty part of each of the plurality of real objects.

Example 28 may include the at least one computer readable storage medium of any one of Examples 22 to 27, wherein one of the plurality of real objects is a storage space, and wherein the instructions, when executed, cause an apparatus to generate a maximum enclosed bounded box for the storage space.

Example 29 may include an apparatus to determine an efficient packing for objects comprising means for generating a digital model of a plurality of real objects based on three-dimensional (3D) sensor data for each of the plurality of real objects, means for generating a bounding box for each of the plurality of real objects, and means for determining a spatially efficient packing sequence for the plurality of real objects, wherein a largest real object of the plurality of real objects contains one or more smaller objects of the plurality of real objects.

Example 30 may include the apparatus of Example 29, further including means to approximate a size and a shape for each of the plurality of real objects in voxels.

Example 31 may include the apparatus of any one of Examples 29 to 30, wherein one or more of the plurality of real objects is an item, the apparatus further including means for approximating a size and a shape for each item in voxels, means for generating a minimal enclosing bounding box for each item, means for determining if any two or more items are mergeable into a bounding box that occupies less volume than a sum of volumes for each individual minimal enclosing bounding box for each of the two or more items, and means for merging the two or more items together in the bounding box if it is determined that the two or more items are mergeable.

Example 32 may include the apparatus of any one of Examples 29-31, further including means for computing a free space utilization value (FSU) of each item with respect to each minimal enclosing bounding box for each item, and means for merging the two or more items into one bounding box if it is determined that the sum of each FSU value is greater than or equal to an FSU of a physically realizable union of the two or more items in the one bounding box.

Example 33 may include the apparatus of any one of Examples 29-32, further including means for identifying each of the plurality of real objects and acquiring non-3D image data corresponding to each of the plurality of the real objects.

Example 34 may include the apparatus of any one of Examples 29-33, further including means for generating a hierarchical volumetric representation of each of the plurality of real objects to detect an empty part of each of the plurality of real objects.

Example 35 may include the apparatus of any one of Examples 29-34, wherein one of the plurality of real objects is a storage space, the apparatus further including means for generating a maximum enclosed bounded box for the storage space.

Example 36 may include a method to determine efficient packing order for a plurality of items with respect to a container, comprising generating, by an item voxelizer, a voxelized digital model of each of the plurality of items based on three-dimensional (3D) sensor data, generating, by at least one sensor, a digital model of the container, generating, by an item boxer, an enclosing bounding box for each of the plurality of items, determining, by an item combiner, which individual items of the plurality of items are mergeable into a single bounding box having less volume than volumes of the bounding boxes of the individual items added together, merging, by the item combiner, the mergeable items into the single bounding box if a combination of the mergeable items is physically realizable to generate one or more merged items, and generating, by a packing plan generator, a packing order of the plurality of items including the one or more merged items into the container.

Example 37 may include the method of Example 36, further including orienting the voxels so that respective voxel sides are aligned to sides of the enclosing bounding box for a given item.

Example 38 may include the method of any one of Examples 36 to 37, wherein determining which item bounding boxes may be merged together includes varying the orientation of one bounding box with respect to another bounding box.

Example 39 may include the method of any one of Examples 36 to 38, wherein varying the orientation is limited to rotations of integral multiples of 90 degrees with respect to any combination of coordinate axes defined for a given bounding box.

Example 40 may include the method of any one of Examples 36 to 39, wherein a hierarchical volumetric representation of the item is computed that includes a representation of empty space within the bounding boxes.

Example 41 may include the method of any one of Examples 36 to 40, further including applying shipping constraints on the packing order.

Example 42 may include an apparatus to determine an efficient packing order for a plurality of items with respect to a container, comprising means for generating a voxelized digital model of each of a plurality of items using 3D sensor data, means for generating a digital model of at least one container, means for generating an enclosing bounding box for each of the items, means for determining which of the items may be merged together into a single bounding box having less volume than the volumes of the bounding boxes of the individual items added together, means for merging the items together into a single bounding box if their combination is physically realizable, and means for generating a packing order of the items, including combined items, into the container.

Example 43 may include the apparatus of Example 42, further including means for orienting the voxels so that their sides are aligned to sides of the enclosing bounding box for a given item.

Example 44 may include the apparatus of any one of Examples 42 to 43, further including means varying the orientation of one bounding box with respect to another bounding box.

Example 45 may include the method of any one of Examples 42 to 44, further including means for computing a hierarchical volumetric representation of each item that includes a representation of empty space within the bounding boxes.

Example 46 may include a method to determine efficient packing order for a plurality of items with respect to a container comprising generating, by an item voxelizer, a voxelized digital model of each of the plurality of items, generating, by at least one sensor, a digital model of the container, generating, by an item boxer, an enclosing bounding box for each of the plurality of items, evaluating, by an item combiner, a free space function for each of the plurality of items, determining, by the item combiner, a plurality of spatial transformations of a second item of the plurality of items with respect to a first item of the plurality of items, evaluating, by the item combiner, a merger criterion for the first item and the second item based on each of the plurality of spatial transformations, and merging, by the item combiner, the first item and the second item into a common bounding box if the merger criterion is met using a most favorable of the spatial transformations of the second item for which the merger criterion is met.

Example 47 may include the method of Example 46, wherein the free space function is $NV(I)=vol(I)/vol(MEBB(I))$, where $NV(I)$ is a normalized volume of an item I, $vol(I)$ is a volume of an item I, and $vol(MEBB(I))$ is a volume of the minimal enclosing bounding box of an item I.

Example 48 may include the method of Example 47, wherein the merger criterion for two items $I_i$ and $I_j$ is that $0.5(NV(I_i)+NV(I_j))<NV(I_i \cup I_j)$, where $(I_i \cup I_j)$ is a union of the two items L and L under a given spatial transformation.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   at least one sensor to provide sensor to an object modeler that is to generate a digital three-dimensional (3D) model of each of a plurality of real objects;
   an object boxer communicatively coupled with the at least one sensor to generate a bounding box for each of the plurality of real objects; and
   a packing plan generator communicatively coupled with the object boxer to determine a spatially efficient packing sequence for the plurality of real objects, wherein at least one of the plurality of real objects contains at least one other of the plurality of real objects.

2. The system of claim 1, further including an object voxelizer to approximate a size and a shape for each of the plurality of real objects in voxels.

3. The system of claim 1, wherein one or more of the plurality of real objects is an item, and wherein the apparatus further includes:
   an item voxelizer to approximate a size and a shape for each item;
   an item boxer to generate a minimal enclosing bounding box for each item; and an item combiner to:
  determine if any two or more items are mergeable into a bounding box that occupies less volume than a sum of volumes for each minimal enclosing bounding box for each of the two or more items; and
  merge the two or more items together in the bounding box if the two or more items are mergeable.

4. The system of claim 3, wherein the item combiner is to:
compute a free space (FS) value of each item with respect to each minimal enclosing bounding box for each item; and
merge the two or more items into one bounding box if a merger criterion is met.

5. The system of claim 1, wherein the at least one sensor includes a 3D sensor, and wherein the system further includes an object identifier to identify each of the plurality of real objects and acquire non-3D image data corresponding to each of the plurality of the real objects.

6. The system of claim 1, further including a hierarchy generator to generate a hierarchical volumetric representation of each of the plurality of real objects to detect an empty part of each of the plurality of real objects.

7. The system of claim 3, wherein one of the plurality of real objects is a storage space, and wherein the system further includes a storage space boxer to generate a maximum enclosed bounded box for the storage space.

8. An apparatus comprising:
a processor;
memory communicatively coupled to the processor; and
logic communicatively coupled to the processor to:
  generate, via an object modeler, a three-dimensional (3D) digital model of a plurality of real objects based on sensor data for each of the plurality of real objects;
  generate, via an object boxer communicatively coupled with the object modeler, a bounding box for each of the plurality of real objects; and
  determine, via a packing plan generator communicatively coupled with the object boxer, a spatially efficient packing sequence for the plurality of real objects, wherein at least one of the plurality of real objects contains at least one other of the plurality of real objects.

9. The apparatus of claim 8, wherein one or more of the plurality of real objects is an item, and wherein the logic is further to:
  approximate, via an item voxelizer, a size and a shape for each item;
  generate, via an item boxer, a minimal enclosing bounding box for each item;
  determine, via an item combiner, if any two or more items are mergeable into a bounding box that occupies less volume than a sum of volumes for each individual minimal enclosing bounding box for each of the two or more items; and
  merge, via the item combiner, the two or more items together in the bounding box if it is determined that the two or more items are mergeable.

10. The apparatus of claim 9, wherein the logic is further to:
  compute, via the item combiner, a free space value (FS) of each item with respect to each minimal enclosing bounding box for each item; and
  merge, via the item combiner, the two or more items into one bounding box if it is determined that a merger criterion is met.

11. The apparatus of claim 8, wherein the logic is further to: identify, via an object identifier, each of the plurality of real objects and acquire non-3D image data corresponding to each of the plurality of the real objects.

12. The apparatus of claim 8, wherein the logic is further to: generate, via a hierarchy generator, a hierarchical volumetric representation of each of the plurality of real objects to detect an empty part of each of the plurality of real objects.

13. The apparatus of claim 8, wherein one or more of the plurality of real objects is a storage space, wherein the logic is further to: generate, via a storage space boxer, a maximum enclosed bounded box for the storage space.

14. A method comprising:
  generating, by at least one sensor, a three-dimensional (3D) digital model of a plurality of real objects based on sensor data for each of the plurality of real objects;
  generating, by an object boxer, a bounding box for each of the plurality of real objects; and
  determining, by a packing plan generator, a spatially efficient packing sequence for the plurality of real objects, wherein at least one of the plurality of real objects contains at least one other of the plurality of real objects.

15. The method of claim 14, wherein one or more of the plurality of real objects is an item, and wherein the method further includes:
  approximating a size and a shape for each item in voxels;
  generating a minimal enclosing bounding box for each item;
  determining if any two or more items are mergeable into a bounding box that occupies less volume than a sum of volumes for each individual minimal enclosing bounding box for each of the two or more items; and
  merging the two or more items together in the bounding box if it is determined that the two or more items are mergeable.

16. The method of claim 15, further including:
  computing a free space value (FS) of each item with respect to each minimal enclosing bounding box for each item; and
  merging the two or more items into one bounding box if it is determined that a merger criterion is met.

17. The method of claim 14, further including identifying each of the plurality of real objects and acquiring non-3D image data corresponding to each of the plurality of the real objects.

18. The method of claim 14, further including generating a hierarchical volumetric representation of each of the plurality of real objects to detect an empty part of each of the plurality of real objects.

19. The method of claim 15, wherein one of the plurality of real objects is a storage space, the method further including generating a maximum enclosed bounded box for the storage space.

20. At least one non-transitory computer readable storage medium comprising a set of instructions, which when executed by an apparatus, cause the apparatus to:
  generate a three-dimensional (3D) digital model of a plurality of real objects based on sensor data for each of the plurality of real objects;
  generate a bounding box for each of the plurality of real objects; and
  determine a spatially efficient packing sequence for the plurality of real objects, wherein at least one of the plurality of real objects contains at least one other of the plurality of real objects.

21. The at least one non-transitory computer readable storage medium of claim 20, wherein one or more of the plurality of real objects is an item, and wherein the instructions, when executed, cause an apparatus to:
   approximate a size and a shape for each item in voxels;
   generate a minimal enclosing bounding box for each item;
   determine if any two or more items of the plurality of items are mergeable into a bounding box that occupies less volume than a sum of volumes for each individual minimal enclosing bounding box for each of the two or more items; and
   merge the two or more items together in the bounding box if it is determined that the two or more items are mergeable.

22. The at least one non-transitory computer readable storage medium of claim 21, wherein the instructions, when executed, cause an apparatus to:
   compute a free space value (FS) of each item with respect to each minimal enclosing bounding box for each item; and
   merge the two or more items into one bounding box if it is determined that a merger criterion is met.

23. The at least one non-transitory computer readable storage medium of claim 20, wherein the instructions, when executed, cause an apparatus to identify each of the plurality of real objects and acquire non-3D image data corresponding to each of the plurality of the real objects.

24. The at least one non-transitory computer readable storage medium of claim 20, wherein the instructions, when executed, cause an apparatus to generate a hierarchical volumetric representation of each of the plurality of real objects to detect an empty part of each of the plurality of real objects.

25. The at least one non-transitory computer readable storage medium of claim 24, wherein one of the plurality of real objects is a storage space, and wherein the instructions, when executed, cause an apparatus to generate a maximum enclosed bounded box for the storage space.

* * * * *